(12) United States Patent
Takeuchi et al.

(10) Patent No.: US 7,595,781 B2
(45) Date of Patent: **\*Sep. 29, 2009**

(54) LIQUID CRYSTAL DISPLAY DEVICE

(75) Inventors: Masanori Takeuchi, Matsusaka (JP);
Nobuyoshi Nagashima, Matsusaka (JP);
Naofumi Kondo, Nara (JP)

(73) Assignee: Sharp Kabushiki Kaisha, Osaka (JP)

( \* ) Notice: Subject to any disclaimer, the term of this patent is extended or adjusted under 35 U.S.C. 154(b) by 183 days.

This patent is subject to a terminal disclaimer.

(21) Appl. No.: 11/314,127

(22) Filed: Dec. 21, 2005

(65) Prior Publication Data

US 2006/0097972 A1  May 11, 2006

Related U.S. Application Data

(63) Continuation of application No. 10/460,372, filed on Jun. 13, 2003, now Pat. No. 7,034,789.

(30) Foreign Application Priority Data

Jun. 17, 2002  (JP) ............................. 2002-175914
May 23, 2003  (JP) ............................. 2003-145917

(51) Int. Cl.
*G09G 3/36* (2006.01)
(52) U.S. Cl. ....................................... 345/90; 345/214
(58) Field of Classification Search ............. 345/87–88, 345/90, 92–95, 100, 204–206, 210–211, 345/214

See application file for complete search history.

(56) References Cited

U.S. PATENT DOCUMENTS 4,345,249 A  8/1982  Togashi
5,162,931 A  11/1992  Holmberg (Continued)

FOREIGN PATENT DOCUMENTS

EP  0365244 B1  10/1989

(Continued)

OTHER PUBLICATIONS

English translation of JP7-311390; Published on Nov. 28, 1995.

(Continued)

*Primary Examiner*—Richard Hjerpe
*Assistant Examiner*—Mansour M Said
(74) *Attorney, Agent, or Firm*—Keating & Bennett, LLP

(57) ABSTRACT

In an active-matrix liquid crystal display device, each of multiple pixels includes a first sub-pixel and a second sub-pixel, through which different voltages are applicable to a portion of the liquid crystal layer. Each of the first and second sub-pixels includes a liquid crystal capacitor defined by a counter electrode and a sub-pixel electrode that faces the counter electrode by way of the liquid crystal layer, and a storage capacitor defined by a storage capacitor electrode, an insulating layer, and a storage capacitor counter electrode. The storage capacitor electrode is electrically connected to the sub-pixel electrode, and the storage capacitor counter electrode faces the storage capacitor electrode by way of the insulating layer. The counter electrode is shared by the first and second sub-pixels and the storage capacitor counter electrodes of the first and second sub-pixels are electrically independent of each other.

20 Claims, 14 Drawing Sheets

U.S. PATENT DOCUMENTS

| | | |
|---|---|---|
| 5,576,863 A | 11/1996 | Aoki et al. |
| 5,654,732 A | 8/1997 | Katakura |
| 5,680,190 A | 10/1997 | Michibayashi et al. |
| 5,777,700 A | 7/1998 | Kaneko et al. |
| 5,796,456 A | 8/1998 | Takatori et al. |
| 5,870,075 A | 2/1999 | Yamazaki et al. |
| 5,923,310 A | 7/1999 | Kim |
| 6,028,577 A | 2/2000 | Sakamoto |
| 6,040,882 A | 3/2000 | Jun et al. |
| 6,081,311 A | 6/2000 | Murai |
| 6,229,589 B1 | 5/2001 | Koma |
| 6,266,116 B1 | 7/2001 | Ohta et al. |
| 6,271,820 B1 | 8/2001 | Bock et al. |
| 6,313,899 B1 | 11/2001 | Wu et al. |
| 6,342,938 B1 | 1/2002 | Song et al. |
| 6,356,335 B1 | 3/2002 | Kim et al. |
| 6,384,889 B1 | 5/2002 | Miyachi et al. |
| 6,400,440 B1 | 6/2002 | Colgan et al. |
| 6,603,524 B1 | 8/2003 | Shimada et al. |
| 6,661,488 B1 | 12/2003 | Takeda et al. |
| 6,710,825 B2 | 3/2004 | Kubo et al. |
| 6,724,359 B2 | 4/2004 | Yamamoto et al. |
| 6,724,450 B1 | 4/2004 | Knoll et al. |
| 6,724,452 B1 | 4/2004 | Takeda et al. |
| 6,741,314 B2 | 5/2004 | Song |
| 6,819,384 B2 | 11/2004 | Nakanishi et al. |
| 6,850,302 B2 | 2/2005 | Song |
| 7,034,789 B2 | 4/2006 | Takeuchi et al. |
| 7,167,224 B1 | 1/2007 | Takeda et al. |
| 7,224,421 B1 | 5/2007 | Takeda et al. |
| 7,227,606 B2 | 6/2007 | Takeda et al. |
| 7,280,177 B2 | 10/2007 | Song |
| 7,304,703 B1 | 12/2007 | Takeda et al. |
| 2001/0006410 A1 | 7/2001 | Yamada et al. |
| 2001/0019383 A1 | 9/2001 | Shin et al. |
| 2001/0019389 A1 | 9/2001 | Lee et al. |
| 2001/0019391 A1 | 9/2001 | Kim et al. |
| 2001/0046003 A1 | 11/2001 | Song |
| 2001/0052949 A1 | 12/2001 | Yamaguchi et al. |
| 2002/0047822 A1* | 4/2002 | Senda et al. .................. 345/90 |
| 2002/0097362 A1 | 7/2002 | Yamada et al. |
| 2002/0109813 A1 | 8/2002 | Yu et al. |
| 2004/0001167 A1 | 1/2004 | Takeuchi et al. |
| 2004/0125253 A1 | 7/2004 | Kim et al. |
| 2004/0125295 A1 | 7/2004 | Kim et al. |
| 2004/0207798 A1 | 10/2004 | Tak et al. |
| 2006/0256271 A1 | 11/2006 | Shimoshikiryo |
| 2007/0064187 A1 | 3/2007 | Takeda et al. |

FOREIGN PATENT DOCUMENTS

| | | |
|---|---|---|
| EP | 0 884 626 A2 | 12/1998 |
| EP | 1 113 312 A2 | 7/2001 |
| JP | 11-109356 A | 4/1990 |
| JP | 2-204727 A | 8/1990 |
| JP | 4-331922 A | 11/1992 |
| JP | 5-19298 A | 1/1993 |
| JP | 7-13191 A | 1/1995 |
| JP | 7-28065 A | 1/1995 |
| JP | 7-28091 A | 1/1995 |
| JP | 7-152013 A | 6/1995 |
| JP | 7-311383 A | 11/1995 |
| JP | 7-311390 A | 11/1995 |
| JP | 8-179341 A | 7/1996 |
| JP | 8-179343 A | 7/1996 |
| JP | 08-179370 | 7/1996 |
| JP | 9-33896 A | 2/1997 |
| JP | 9-43610 A | 2/1997 |
| JP | 9-179141 A | 7/1997 |
| JP | 09-189922 A | 7/1997 |
| JP | 9-258266 A | 10/1997 |
| JP | 10-197894 A | 7/1998 |
| JP | 10-222097 A | 8/1998 |
| JP | 10-268349 A | 10/1998 |
| JP | 11-242225 A | 9/1999 |
| JP | 2000-162602 A | 6/2000 |
| JP | 2000-235371 | 8/2000 |
| JP | 2001-109018 A | 4/2001 |
| JP | 2001-235748 A | 8/2001 |
| JP | 2001-337349 A | 12/2001 |
| JP | 2002-40400 A | 2/2002 |
| JP | 2002-122877 A | 4/2002 |
| JP | 2002-139735 A | 5/2002 |

OTHER PUBLICATIONS

English translation of JP11-109356; Published on Apr. 23, 1999.

Official communication dated May 7, 2005 issued in the corresponding Korean Application No. 10-2003-039053, (With full English translation).

English translation of Japanese Laid-Open Patent Publication No. 07-013191, published on Jan. 17, 1995.

English translation of Japanese Laid-Open Patent Publication No. 09-179141, published on Jul. 11, 1997.

English translation of Japanese Patent Application No. 2000-235371; Kind Code: A; Published on Aug. 26, 2000.

Exhibit 3 of Plaintiff Sharp Corporation's Preliminary Invalidity Contentions; Case No. 2:07-cv-330; Aug. 18, 2008; 88 pages.

Takeuchi et al.: "Liquid Crsytal Display Device," U.S. Appl. No. 12/237,575; filed on Sep. 25, 2008.

* cited by examiner

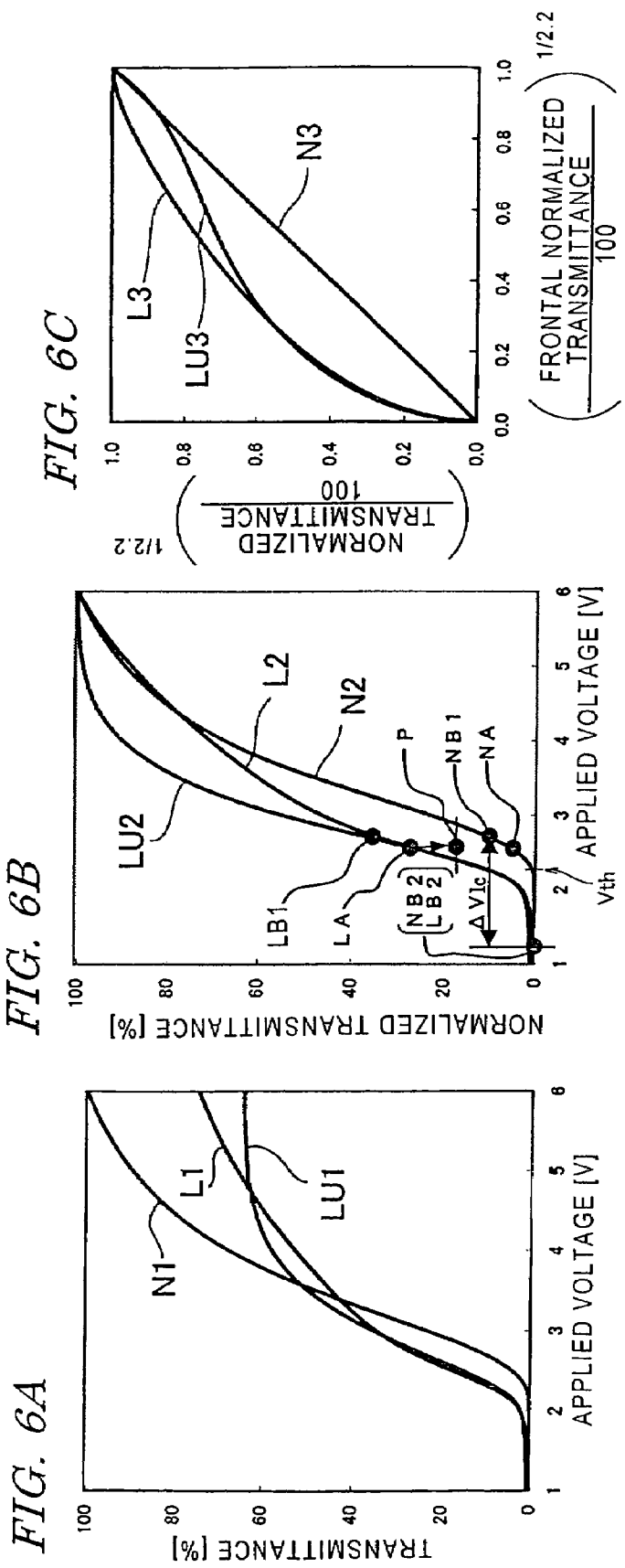

LIQUID CRYSTAL DISPLAY DEVICE

This application is a Continuation Application of U.S. patent application Ser. No. 10/460,372 filed Jun. 13, 2003 now U.S. Pat. No. 7,034,789.

BACKGROUND OF THE INVENTION

1. Field of the Invention

The present invention relates to a liquid crystal display device and more particularly, the present invention relates to a liquid crystal display device of a pixel-divided type.

2. Description of the Related Art

A liquid crystal display (LCD) is a flat-panel display that has a number of advantageous features including high resolution, drastically reduced thickness and weight, and low power dissipation. The LCD market has been rapidly expanding recently as a result of tremendous improvements in its display performance, significant increases in its productivity, and a noticeable rise in its cost effectiveness over competing technologies.

A twisted-nematic (TN) mode liquid crystal display device, which used to be used extensively in the past, is subjected to an alignment treatment such that the major axes of its liquid crystal molecules, exhibiting positive dielectric anisotropy, are substantially parallel to the respective principal surfaces of upper and lower substrates and are twisted by about 90 degrees in the thickness direction of the liquid crystal layer between the upper and lower substrates. When a voltage is applied to the liquid crystal layer, the liquid crystal molecules change their orientation direction to a direction that is parallel to the electric field applied. As a result, the twisted orientation disappears. The TN mode liquid crystal display device utilizes variations in the optical rotatory characteristic of its liquid crystal layer due to the change of orientation directions of the liquid crystal molecules in response to the voltage applied, thereby controlling the quantity of light transmitted.

The TN mode liquid crystal display device allows a broad enough manufacturing margin and achieves a high productivity. However, the display performance (e.g., the viewing angle characteristic, in particular) thereof is not fully satisfactory. More specifically, when an image on the screen of the TN mode liquid crystal display device is viewed obliquely, the contrast ratio of the image decreases significantly. In that case, even an image, of which the grayscales ranging from black to white are clearly observable when the image is viewed straightforward, loses much of the difference in brightness between those grayscales when viewed obliquely. Furthermore, the grayscale characteristic of the image being displayed thereon may sometimes invert itself. That is to say, a portion of an image, which looks darker when viewed straight, may look brighter when viewed obliquely.

To improve the viewing angle characteristic of such a TN mode liquid crystal display device, one pixel electrode may be divided into multiple sub-pixel electrodes such that the voltage to be applied to the pixel electrode is distributed to those multiple sub-pixel electrodes at a predetermined ratio as proposed in Japanese Laid-Open Publication No. 6-332009, for example. Such a technique will be referred to herein as a "pixel dividing technique". In the arrangement disclosed in Japanese Laid-Open Publication No. 6-332009, a control capacitor electrode is provided so as to face multiple sub-pixel electrodes with an insulating layer interposed between them and to apply voltages to the sub-pixel electrodes at a predetermined ratio by forming capacitors to be coupled with the sub-pixel electrodes.

In that arrangement, however, the voltages being applied to the sub-pixel electrodes are changeable due a variation in the thickness of the insulating layer that is provided between the sub-pixel electrodes and the control capacitor electrode. Thus, it is difficult to control the voltages being applied to the sub-pixel electrodes at the predetermined ratio.

Also, in the arrangement described above, the higher the voltages being applied, the greater the potential difference between the sub-pixel electrodes. The present inventors discovered and confirmed via experiments that the application of such voltages effectively improved the viewing angle characteristic of a liquid crystal display device operating in a display mode that shows heavy viewing angle dependence responsive to relatively high voltages applied (e.g., a normally white mode TN mode liquid crystal display device) but could not improve the viewing angle dependence of the γ characteristic of a normally black mode liquid crystal display device sufficiently.

Examples of normally black mode liquid crystal display devices include an in-plane switching (IPS) mode liquid crystal display device (see Japanese Patent Gazette for Opposition No. 63-21907), a multi-domain vertical aligned (MVA) mode liquid crystal display device (see Japanese Laid-Open Publication No. 11-242225), and an axisymmetric aligned (ASM) mode liquid crystal display device (see Japanese Laid-Open Publication No. 10-186330), all of which were developed relatively recently as TN mode liquid crystal display devices with improved viewing angle characteristics. In a liquid crystal display device operating in each of these newly developed wide viewing angle modes, even when an image on the screen is viewed obliquely, the contrast ratio never decreases significantly or the grayscales never invert unlike the old-fashioned TN mode liquid crystal display devices.

However, as the display quality of liquid crystal display devices has been further improved recently, the viewing angle dependence of the γ characteristic surfaced as a non-negligible problem to resolve in order to improve the viewing angle characteristic. That is to say, a liquid crystal display device may exhibit different γ characteristics when an image on the screen is viewed straightforward and when the same image is viewed obliquely, respectively. As used herein, the "γ characteristic" means the grayscale dependence of display brightness. That is to say, if the γ characteristic in the frontal direction is different from that in the oblique direction, then the grayscales sensed in the frontal direction will be different from those sensed in the oblique direction. Thus, this problem is particularly non-negligible when an image such as a still picture is displayed or when a televised video is displayed.

The viewing angle dependence of the γ characteristic is more remarkable in the MVA mode or in the ASM mode than in the IPS mode. On the other hand, when the IPS mode is adopted, it is more difficult to manufacture panels showing a sufficiently high contrast ratio to the front viewer than the MVA mode or ASM mode. In view of these considerations, the viewing angle dependence of the γ characteristic of the MVA or ASM mode liquid crystal display device should be improved.

SUMMARY OF THE INVENTION

In order to overcome the problems described above, preferred embodiments of the present invention provide a pixel-divided liquid crystal display device having significantly increased controllability of voltages to be applied to sub-pixels and also provide a novel pixel dividing technique that greatly improves the γ characteristic of a normally black mode liquid crystal display device.

A liquid crystal display device according to a preferred embodiment of the present invention preferably includes multiple pixels, which are arranged in columns and rows and each of which includes an associated portion of a liquid crystal layer and at least two electrodes that are used to apply a voltage to the portion of the liquid crystal layer. Each of the pixels preferably includes a first sub-pixel and a second sub-pixel, through which mutually different voltages are applicable to the associated portion of the liquid crystal layer. Each of the first and second sub-pixels preferably includes: a liquid crystal capacitor, which is defined by a counter electrode and a sub-pixel electrode that faces the counter electrode by way of the liquid crystal layer, and a storage capacitor, which is defined by a storage capacitor electrode, an insulating layer, and a storage capacitor counter electrode. The storage capacitor electrode is preferably electrically connected to the sub-pixel electrode, and the storage capacitor counter electrode preferably faces the storage capacitor electrode by way of the insulating layer. The counter electrode is preferably shared by the first and second sub-pixels and the storage capacitor counter electrodes of the first and second sub-pixels are preferably electrically independent of each other.

In one preferred embodiment of the present invention, the liquid crystal display device preferably further includes gate lines, which extend along the rows of pixels, source lines, which extend along the columns of pixels, and multiple pairs of switching elements. Each pair of switching elements is preferably provided for the first and second sub-pixels of an associated one of the pixels and is preferably connected to one of the gate lines and one of the source lines that are associated with the pixel. ON/OFF states of each pair of switching elements are preferably controlled by a gate signal voltage to be supplied through the associated gate line. When the pair of switching elements is ON, a source signal voltage is preferably supplied through the associated source line to the sub-pixel electrodes and the storage capacitor electrodes of the first and second sub-pixels. After the pair of switching elements has been turned OFF, voltages applied to the storage capacitor counter electrodes of the first and second sub-pixels preferably vary. The direction and magnitude of the variation at the first sub-pixel are preferably different from those of the variation at the second sub-pixel. In this case, the variation of the voltage applied to each storage capacitor counter electrode includes not only the absolute value but also a sign. For example, the variations of the voltages applied to the storage capacitor counter electrodes of the first and second sub-pixels may have the same absolute value and opposite signs. That is to say, if the voltage applied to one storage capacitor counter electrode increases but the voltage applied to the other storage capacitor counter electrode decreases after the switching elements have been turned OFF, those variations may have the same absolute value.

In one preferred embodiment of the present invention, the voltages applied to the storage capacitor counter electrodes may invert their polarities at regular intervals.

In this particular preferred embodiment, the voltages applied to the storage capacitor counter electrodes of the first and second sub-pixels may be out of phase with each other by 180 degrees.

In that case, the voltages applied to the storage capacitor counter electrodes of the first and second sub-pixels may have the same amplitude.

In another preferred embodiment, the source signal voltage to be supplied through each source line preferably inverts its polarities every time a predetermined number of gate lines have been selected.

In still another preferred embodiment, the source signal voltages to be supplied through each pair of adjacent source lines preferably have mutually opposite polarities.

In this particular preferred embodiment, the source signal voltage to be supplied through each source line may invert its polarities every time two of the gate lines have been selected, and the voltages applied to the storage capacitor counter electrodes and the source signal voltage may invert their polarities at the same interval but may be out of phase with each other by one half period.

In an alternative preferred embodiment, the source signal voltage to be supplied through each source line may invert its polarities every time two of the gate lines have been selected, and the voltages applied to the storage capacitor counter electrodes may invert their polarities at half of the interval at which the source signal voltage inverts its polarities, but may be in phase with the source signal voltage.

In another alternative preferred embodiment, the source signal voltage to be supplied through each source line may invert its polarities every time one of the gate lines is selected, and the voltages applied to the storage capacitor counter electrodes may invert their polarities at the same interval as the source signal voltage and may be in phase with the source signal voltage.

In yet another preferred embodiment, each gate line is preferably provided between the first and second sub-pixels of its associated pixels.

In yet another preferred embodiment, the liquid crystal display device preferably further includes storage capacitor lines. Each of the storage capacitor lines is preferably connected to the storage capacitor counter electrodes of the first and second sub-pixels of its associated pixels and is preferably provided between its associated adjacent pixels in parallel to the gate lines.

In yet another preferred embodiment, when each pixel conducts a display operation at a grayscale gk falling within the range of $0 \leqq gk \leqq gn$ (where gk and gn are both integers and the greater the grayscale gk the higher the brightness of the grayscale), a difference $\Delta Vlc$ (gk) between root-mean-square voltages to be applied to the portions of the liquid crystal layer that are associated with the first and second sub-pixels is preferably greater than 0 volts, $\Delta Vlc$ (gk)$\geqq \Delta Vlc$ (gk+1) is preferably satisfied, and the display operation is preferably conducted in a normally black mode.

In yet another preferred embodiment, the liquid crystal layer may be a vertical aligned liquid crystal layer and may include a nematic liquid crystal material having negative dielectric anisotropy.

In this particular preferred embodiment, the portions of the liquid crystal layer that are associated with the first and second sub-pixels may include four domains in which liquid crystal molecules are tilted in four different directions when a voltage is applied thereto. The four different directions may be defined by four azimuth angles that are different from each other by 90 degrees.

In yet another preferred embodiment, the liquid crystal layer may be a parallel aligned liquid crystal layer and may include a nematic liquid crystal material having positive dielectric anisotropy, and the counter electrode and the sub-pixel electrodes may generate an electric field that is substantially parallel to the surface of the liquid crystal layer.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIGS. 6A, 6B and 6C show the display characteristics of an MVA mode liquid crystal display device, wherein:

FIG. 6A is a graph showing the applied voltage dependence of the transmittance;

FIG. 6B is a graph showing the applied voltage dependence of the transmittance that was normalized with a transmittance in a white display mode; and FIG. 6C is a graph showing the γ characteristic.

DETAILED DESCRIPTION OF PREFERRED EMBODIMENTS

Figure 1:
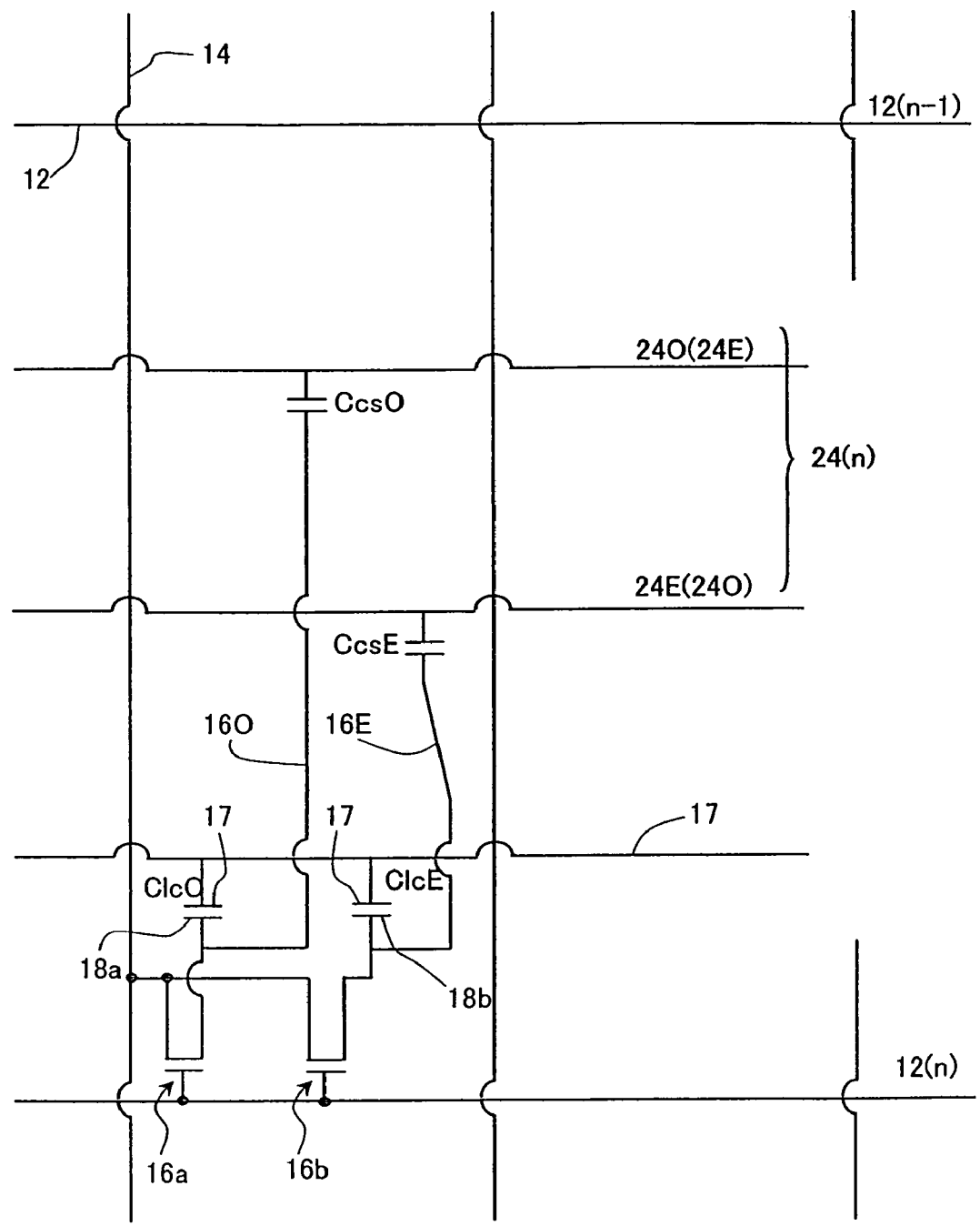
FIG. 1 is an equivalent circuit diagram of a liquid crystal panel included in a liquid crystal display device according to a preferred embodiment of the present invention.

In a liquid crystal display device according to a preferred embodiment of the present invention, each pixel preferably includes a first sub-pixel and a second sub-pixel, through which mutually different voltages are applicable to the liquid crystal layer. Each of the first and second sub-pixels preferably includes a liquid crystal capacitor and a storage capacitor, which is electrically connected to the liquid crystal capacitor. The liquid crystal capacitor is preferably defined by a counter electrode and a sub-pixel electrode that faces the counter electrode by way of the liquid crystal layer. The storage capacitor is preferably defined by a storage capacitor electrode, an insulating layer, and a storage capacitor counter electrode. The storage capacitor electrode is preferably electrically connected to the sub-pixel electrode. The storage capacitor counter electrode preferably faces the storage capacitor electrode by way of the insulating layer. The counter electrode is preferably shared by the first and second sub-pixels and the storage capacitor counter electrodes of the first and second sub-pixels are preferably electrically independent of each other. By supplying storage capacitor counter voltages to these storage capacitor counter electrodes electrically independently, mutually different voltages can be applied to portions of the liquid crystal layer that are associated with the first and second sub-pixels.

In the conventional arrangement disclosed in Japanese Laid-Open Publication No. 6-332009, the potential difference, which is created between two sub-pixel electrodes and a single control capacitor electrode (that faces the two sub-pixel electrodes with an insulating layer interposed between them), is divided at a ratio to be determined by the magnitudes of respective capacitances. In contrast, in the liquid crystal display device of this preferred embodiment, voltages to be applied to respective sub-pixels (i.e., the liquid crystal capacitors of the sub-pixels) can be regulated by controlling the storage capacitor counter voltages to be applied to the storage capacitor counter electrodes that are connected to the respective sub-pixel electrodes. Thus, the voltages to be applied to the sub-pixels can be controlled more precisely than the conventional arrangement.

The various preferred embodiments of the present invention contribute to significantly improving the display quality of liquid crystal display devices. Thus, the present invention can be used effectively in an active matrix addressed liquid crystal display device in which a switching element is provided for each sub-pixel. Among other things, the present invention is particularly effective in a wide-viewing-angle liquid crystal display device, which includes a vertical aligned liquid crystal layer made of a nematic liquid crystal material with negative dielectric anisotropy and which conducts a display operation in the normally black mode. According to preferred embodiments of the present invention, voltages can be applied to sub-pixels so as to compensate for the viewing angle dependence of the γ characteristic of the MVA or ASM mode liquid crystal display device. Furthermore, the liquid crystal display devices of preferred embodiments of the present invention can cope with a drive method that achieves the display of an image of quality such as line inversion drive or dot inversion drive.

Hereinafter, preferred embodiments of the present invention will be described with reference to the accompanying drawings.

FIG. 1 is an equivalent circuit diagram of a liquid crystal panel in a liquid crystal display device according to a preferred embodiment of the present invention.

This liquid crystal panel is an active matrix addressed liquid crystal panel including pixels that are arranged in a matrix (i.e., in columns and rows). Those pixels will be sometimes referred to herein as "dots". The pixel shown in FIG. 1 in detail is located at the intersection between the $n^{th}$ row and $m^{th}$ column.

Each pixel preferably includes a first sub-pixel and a second sub-pixel. As shown in FIG. 1, the first sub-pixel preferably includes a liquid crystal capacitor ClcO and the second sub-pixel preferably includes a liquid crystal capacitor ClcE. The liquid crystal capacitor ClcO of the first sub-pixel is preferably defined by a first sub-pixel electrode 18a, a counter electrode 17 and a liquid crystal layer located between them. The liquid crystal capacitor ClcE of the second sub-pixel is preferably defined by a second sub-pixel electrode 18b, the counter electrode 17 and the liquid crystal layer located between them. The first sub-pixel electrode 18a is preferably connected to a source line 14 by way of a TFT 16a, while the second sub-pixel electrode 18b is preferably connected to the same source line 14 by way of a TFT 16b. The gate electrodes of the TFTs 16a and 16b are preferably connected to the same gate line 12.

The first and second sub-pixels preferably include a first storage capacitor CcsO and a second storage capacitor CcsE, respectively, as shown in FIG. 1. The storage capacitor electrode of the first storage capacitor CcsO is preferably connected to the drain of the TFT 16a by way of an extended portion 16O of its drain electrode. The storage capacitor electrode of the second storage capacitor CcsE is preferably connected to the drain of the TFT 16b by way of an extended portion 16E of its drain electrode. The storage capacitor electrodes do not have to be connected as shown in FIG. 1 but may be electrically connected to their associated sub-pixels such that each of these storage capacitor electrodes and its associated sub-pixel electrode are supplied with the same voltage. That is to say, each sub-pixel electrode and its associated storage capacitor electrode have only to be electrically connected together either directly or indirectly.

The storage capacitor counter electrode of the first storage capacitor CcsO is preferably connected to a storage capacitor line 24O (or 24E), while the storage capacitor counter electrode of the second storage capacitor CcsE is preferably connected to a storage capacitor line 24E (or 24O). In this arrangement, mutually different storage capacitor counter voltages can be applied to the storage capacitor counter electrodes of the first and second storage capacitors. The connection between each storage capacitor counter electrode and its associated storage capacitor line are appropriately determined according to the drive method adopted (e.g., dot inversion drive) as will be described later.

Hereinafter, it will be described with reference to FIG. 2 how mutually different voltages can be applied to the liquid crystal capacitors ClcO and ClcE of the first and second sub-pixels in the circuit configuration shown in FIG. 1.

Figure 2:
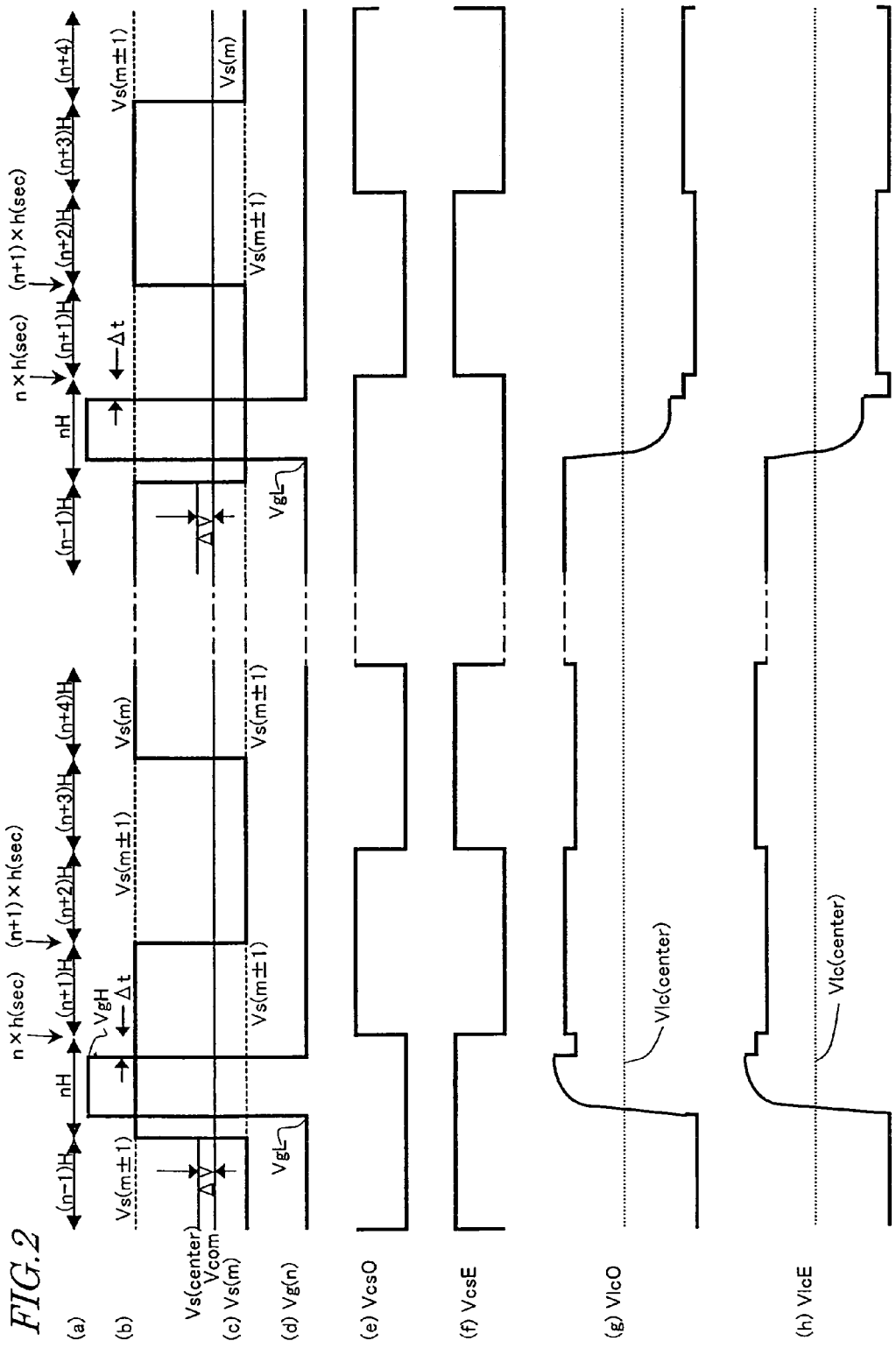
FIG. 2 shows the waveforms of a set of voltages to be applied to drive the liquid crystal panel shown in FIG. 1.

FIG. 2 shows the voltage waveforms and timings of respective signals to be supplied to the pixel (n, m) shown in FIG. 1. In FIG. 2, portion (a) shows two horizontal scanning periods H corresponding to two frame periods. Portion (b) shows the waveform of a source signal voltage Vs(m±1) to be supplied to the (m±1)$^{th}$ source lines 14 (as indicated by dashed line). Portion (c) shows the waveform of a source signal voltage (i.e., grayscale signal voltage) Vs(m) to be supplied to the m$^{th}$ source line 14 (as indicated by the solid line). Portion (d) shows the waveform of a gate signal voltage Vg(n) to be supplied to the n$^{th}$ gate line 12. Portions (e) and (f) show the waveforms of storage capacitor counter voltages VcsO and VcsE to be supplied to the storage capacitor lines 24O and 24E, respectively. And portions (g) and (h) show the waveforms of voltages VlcO and VlcE to be applied to the liquid crystal capacitors ClcO and ClcE of the first and second sub-pixels, respectively.

The drive method shown in FIG. 2 is a preferred embodiment of the present invention which is designed to drive a 2H dot-inversion and frame-inversion type liquid crystal display device.

Specifically, in the liquid crystal display device of the 2H dot-inversion and frame-inversion type, every time two gate lines have been selected (i.e., every time two horizontal scanning periods 2H have passed), the source signal voltage Vs supplied to the source line 14 inverts its polarities and the source signal voltages Vs supplied to two adjacent source lines (e.g., Vm and V(m±1)) have mutually opposite polarities. In this manner, the 2H dot-inversion drive is carried out. Also, the source signal voltages Vs supplied to the source lines 14 all invert their polarities every frame, thus performing the frame-inversion drive.

In this case, the period in which the storage capacitor counter voltages VcsO and VcsE invert their polarities is equal to the period (i.e., 2H) in which the source signal voltage inverts its polarities. The waveforms of the storage capacitor counter voltages VcsO and VcsE are out of phase with that of the source signal voltage by one half period (i.e., 1H). Also, the waveforms of the storage capacitor counter voltages VcsO and VcsE have the same amplitude but two different phases that are shifted from each other by 180 degrees.

Next, it will be described with reference to FIG. 2 why the voltages VlcO and VlcE applied to the liquid crystal capacitors ClcO and ClcE change their waveforms as shown in FIG. 2.

When the gate signal voltage Vg is at a high level VgH, the TFTs 16a and 16b are turned ON to apply the source signal voltage Vs on the source line 14 to the sub-pixel electrodes 18a and 18b. The voltage VlcO between the two terminals of the liquid crystal capacitor ClcO is defined as the difference between the voltage Vs applied to the sub-pixel electrode 18a and the voltage Vcom applied to the counter electrode 17. In the same way, the voltage VlcE between the two terminals of the liquid crystal capacitor ClcE is defined as the difference between the voltage Vs applied to the sub-pixel electrode 18b and the voltage Vcom applied to the counter electrode 17. That is to say, VlcO=Vs−Vcom and VlcE=Vs−Vcom.

In (n×h−Δt) seconds, the gate signal voltage Vg drops from its ON-state high voltage VgH to its OFF-state low voltage VgL (<Vs). Then, due to a so-called "pulling" phenomenon, the voltage applied to the sub-pixel electrodes 18a and 18b decreases by ΔV. Thus, the voltage Vcom applied to the counter electrode 17 is decreased to a value that is lower than the center potential of the source signal voltage Vs by this difference ΔV.

Thereafter, in (n×h) seconds, the voltage VlcO applied to the liquid crystal capacitor ClcO changes because of being affected by the voltage VcsO at the storage capacitor counter electrode 22a of the storage capacitor CcsO, which is electrically connected to the sub-pixel electrode 18a of the liquid crystal capacitor ClcO. At the same time, the voltage VlcE applied to the liquid crystal capacitor ClcE also changes because of being affected by the voltage VcsE at the storage capacitor counter electrode 22b of the storage capacitor CcsE, which is electrically connected to the sub-pixel electrode 18b of the liquid crystal capacitor ClcE. Suppose the storage capacitor counter voltage VcsO increases by VcsOp (>0) and the storage capacitor counter voltage VcsE decreases by VcsEp (>0) in (n×h) seconds. That is to say, the full amplitude (Vp-p) of the storage capacitor counter voltage VcsO is supposed to be VcsOp and the full amplitude of the storage capacitor counter voltage VcsE is supposed to be VcsEp.

The voltage VlcO applied to the liquid crystal capacitor ClcO is given by:

$$VlcO=Vs-\Delta V+VcsOp(CcsO/CpixO)-Vcom$$

where CpixO is the total capacitance of the liquid crystal capacitor ClcO and storage capacitor CcsO that are connected to the drain of the TFT 16a.

On the other hand, the voltage VlcE applied to the liquid crystal capacitor ClcE is given by:

$$VlcE=Vs-\Delta V-VcsEp(CcsE/CpixE)-Vcom$$

where CpixE is the total capacitance of the liquid crystal capacitor ClcE and storage capacitor CcsE that are connected to the drain of the TFT 16b.

Next, in (n+2)×h seconds (i.e., at the beginning of (n+3)H), the voltages VlcO and VlcE applied to the liquid crystal capacitors ClcO and ClcE are affected by the storage capacitor counter voltages VcsO and VcsE to regain their original values at the end of nH:

$$VlcO = Vs - \Delta V - Vcom$$

$$VlcE = Vs - \Delta V - Vcom$$

These voltage variations are repeatedly produced until Vg(n) reaches the VgH level in the next frame. As a result, VlcO and VlcE come to have mutually different root-mean-square values.

Thus, the root-mean-square values VlcOrms and VlcErms of VlcO and VlcE are given by:

$$VlcOrms = Vs - \Delta V + (\tfrac{1}{2})VcsOp(CcsO/CpixO) - Vcom$$

$$VlcErms = Vs - \Delta V - (\tfrac{1}{2})VcsEp(CcsE/CpixE) - Vcom$$

where $(Vs-\Delta V-Vcom) \gg VcsOp(CcsO/CpixO)$ and $(Vs-\Delta V-Vcom) \gg VcsEp(CcsE/CpixE)$. Accordingly, the difference between these root-mean-square values $\Delta Vlc$ (=VlcOrms−VlcErms) is given by:

$$\Delta Vlc = (\tfrac{1}{2})\{VcsOp(CcsO/CpixO) + VcsEp(CcsE/CpixE)\}$$

Supposing the liquid crystal capacitances of the two sub-pixels are equal to each other and the storage capacitances thereof are also equal to each other (i.e., ClcO=ClcE=Clc, CcsO=CcsE=Ccs, and CpixO=CpixE=Cpix), $$\Delta Vlc = (\tfrac{1}{2})(VcsOp + VcsEp)(Ccs/Cpix)$$

If VcsOp=VcsEp but VcsO and VcsE have two different phases that are shifted from each other by 180 degrees as shown in FIG. 2 and if VcsOp=VcsEp=Vcsp, then $$\Delta Vlc = Vcsp(Ccs/Cpix)$$

As a result, VlcO has a relatively large root-mean-square value and VlcE has a relatively small root-mean-square value.

It should be noted that if the voltages VcsO and VcsE are interchanged with each other, then VlcO may have a relatively small root-mean-square value and VlcE may have a relatively large root-mean-square value. Alternatively, VlcO and VlcE may also have a relatively small root-mean-square value and a relatively large root-mean-square value, respectively, even when the storage capacitor counter electrodes of the storage capacitors CcsO and CcsE are connected to the opposite storage capacitor lines 24E and 24O, respectively.

In this preferred embodiment, the frame inversion drive is preferably carried out. Thus, in the next frame, Vs inverts its polarity and Vlc<0. However, if the polarities of VcsO and VcsE are also inverted simultaneously, similar effects are achieved.

Also, in this preferred embodiment, the source signal voltages being supplied to each pair of adjacent source lines 14 preferably have mutually opposite polarities to perform the dot inversion drive. Accordingly, in the next frame, the pixel (n, m) will be driven in the same way as two pixels (n, m±1) that are horizontally adjacent to (i.e., belong to the same row n as) the pixel (n, m) with respect to the source line 14.

Hereinafter, the polarity distribution of the voltages to be applied to respective pixels (or liquid crystal capacitors) in a frame, the combinations of storage capacitor counter voltages (or storage capacitor lines) of the pixels, and the distribution of the root-mean-square voltages to be applied to the sub-pixels of the respective pixels will be described with reference to the following Tables 1, 2 and 3, respectively. The data shown in these three tables were obtained by driving the liquid crystal display device by the method shown in FIG. 2.

TABLE 1

|       | m − 1 | m | m + 1 | m + 2 |
|-------|-------|---|-------|-------|
| n − 1 | +     | − | +     | −     |
| n     | −     | + | −     | +     |
| n + 1 | −     | + | −     | +     |
| n + 2 | +     | − | +     | −     |

TABLE 2

|       | m − 1 | m   | m + 1 | m + 2 |
|-------|-------|-----|-------|-------|
| n − 1 | 24O   | 24E | 24O   | 24E   |
|       | 24E   | 24O | 24E   | 24O   |
| n     | 24E   | 24O | 24E   | 24O   |
|       | 24O   | 24E | 24O   | 24E   |
| n + 1 | 24O   | 24E | 24O   | 24E   |
|       | 24E   | 24O | 24E   | 24O   |
| n + 2 | 24E   | 24O | 24E   | 24O   |
|       | 24O   | 24E | 24O   | 24E   |

TABLE 3

|       | m − 1     | m         | m + 1     | m + 2     |     |
|-------|-----------|-----------|-----------|-----------|-----|
| n − 1 | Clc/Ccs-E | Clc/Ccs-O | Clc/Ccs-E | Clc/Ccs-O |     |
|       | Clc/Ccs-O | Clc/Ccs-E | Clc/Ccs-O | Clc/Ccs-E | 24O |
| n     | Clc/Ccs-E | Clc/Ccs-O | Clc/Ccs-E | Clc/Ccs-O |     |
|       | Clc/Ccs-O | Clc/Ccs-E | Clc/Ccs-O | Clc/Ccs-E | 24E |
| n + 1 | Clc/Ccs-E | Clc/Ccs-O | Clc/Ccs-E | Clc/Ccs-O |     |
|       | Clc/Ccs-O | Clc/Ccs-E | Clc/Ccs-O | Clc/Ccs-E | 24O |
| n + 2 | Clc/Ccs-E | Clc/Ccs-O | Clc/Ccs-E | Clc/Ccs-O |     |
|       | Clc/Ccs-O | Clc/Ccs-E | Clc/Ccs-O | Clc/Ccs-E | 24E |

As can be seen from Table 1, when the drive method shown in FIG. 2 is adopted, the 2H dot inversion drive, in which the polarities of the voltages being applied to the respective pixels invert every third row and every column, can be carried out. In the frame next to that shown in Table 1, all of these polarities will be inverted (i.e., frame inversion will be achieved).

In this preferred embodiment, if the combinations of storage capacitor lines shown in Table 2 are adopted for the respective pixels such that the sub-pixel electrodes of each of those pixels are connected to their associated combination of storage capacitor lines by way of the storage capacitor counter electrodes of their associated storage capacitors, then the distribution of root-mean-square voltages shown in Table 3 can be obtained. In Table 2, the reference numeral 24O or 24E shown on the upper row of each cell denotes the storage capacitor line 24O or 24E, to which the storage capacitor counter electrode to be combined with the sub-pixel electrode 18a is connected. On the other hand, the reference numeral 24O or 24E shown on the lower row of each cell denotes the storage capacitor line 24O or 24E, to which the storage capacitor counter electrode to be combined with the sub-pixel electrode 18b is connected. In the same way, in Table 3, the upper row of each cell represents the root-mean-square voltage to be applied to the sub-pixel (or liquid crystal capacitor) defined by the sub-pixel electrode 18a, while the lower row of each cell represents the root-mean-square voltage to be applied to the sub-pixel (or liquid crystal capacitor) defined by the sub-pixel electrode 18b. In Table 3, the sub-pixel root-mean-square voltage with "O" is relatively high, while the sub-pixel root-mean-square voltage with "E" is relatively low.

As can be seen from Table 3, when the drive method shown in FIG. 2 is adopted, the 2H dot inversion drive can be carried out as shown in Table 1 and the root-mean-square voltages to be applied to the respective sub-pixels alternate their levels on a sub-pixel basis both in the column and row directions. When the distribution of the root-mean-square voltages to be applied to the respective sub-pixels has such a high spatial frequency, an image of quality can be displayed.

Figure 3:
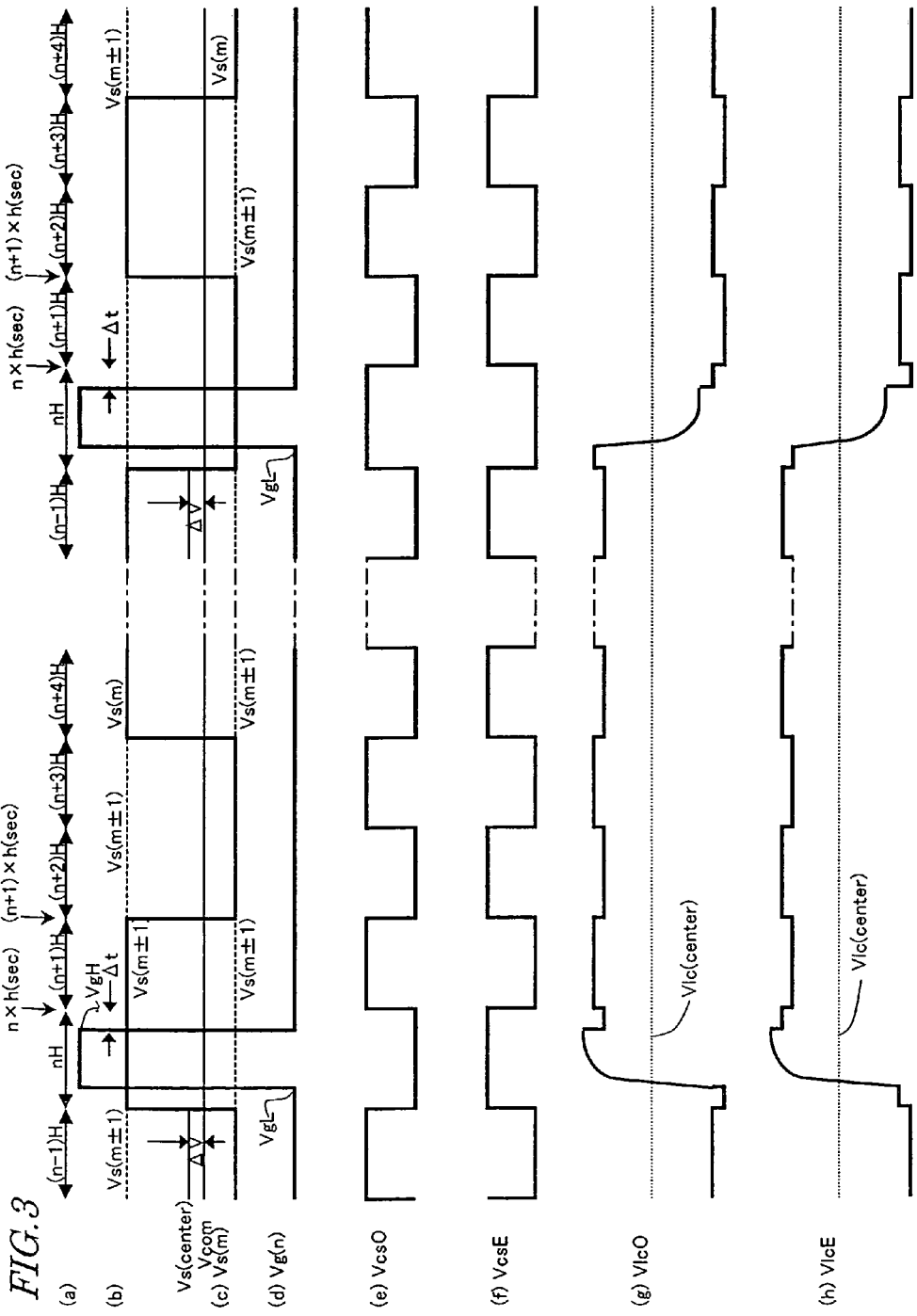
FIG. 3 shows the waveforms of another set of voltages to be applied to drive the liquid crystal panel shown in FIG. 1.

The drive method shown in FIG. 2 is most preferred. However, any other drive method may be adopted as well. For example, even when the 2H dot inversion and frame inversion methods are adopted in combination as in FIG. 2, the storage capacitor counter voltages VcsO and VcsE may have their polarities inverted at an interval of 1H as shown in FIG. 3.

Alternatively, a combination of 1H dot inversion and frame inversion may be adopted instead of the combination of 2H dot inversion and frame inversion described above. That is to say, a drive method in which the polarity of the source signal voltage Vs shown in FIG. 3 is inverted at an interval of 1H may also be adopted. When such a drive method is adopted, a dot inversion drive, in which the voltages being applied to the pixels have their polarities inverted pixel by pixel both in the column and row directions, is realized as shown in the following Table 4.

TABLE 4

|       | m − 1 | m | m + 1 | m + 2 |
|---|---|---|---|---|
| n − 1 | + | − | + | − |
| n     | − | + | − | + |
| n + 1 | + | − | + | − |
| n + 2 | − | + | − | + |

Also, by selecting the storage capacitor lines 24O and 24E, which are combined with the sub-pixel electrodes 18a and 18b and to which the storage capacitor counter electrodes are connected, as shown in the following Table 5, the voltage distribution shown in the following Table 6 is formed.

TABLE 5

|       | m − 1 | m | m + 1 | m + 2 |
|---|---|---|---|---|
| n − 1 | 24E | 24O | 24E | 24O |
|       | 24O | 24E | 24O | 24E |
| n     | 24E | 24O | 24E | 24O |
|       | 24O | 24E | 24O | 24E |
| n + 1 | 24E | 24O | 24E | 24O |
|       | 24O | 24E | 24O | 24E |
| n + 2 | 24E | 24O | 24E | 24O |
|       | 24O | 24E | 24O | 24E |

TABLE 6

|       | m − 1 | m | m + 1 | m + 2 | |
|---|---|---|---|---|---|
| n − 1 | Clc/Ccs-O | Clc/Ccs-E | Clc/Ccs-E | Clc/Ccs-E | |
|       | Clc/Ccs-E | Clc/Ccs-O | Clc/Ccs-E | Clc/Ccs-O | 24O |
| n     | Clc/Ccs-E | Clc/Ccs-O | Clc/Ccs-E | Clc/Ccs-O | |
|       | Clc/Ccs-O | Clc/Ccs-E | Clc/Ccs-O | Clc/Ccs-E | 24E |
| n + 1 | Clc/Ccs-O | Clc/Ccs-E | Clc/Ccs-O | Clc/Ccs-E | |
|       | Clc/Ccs-E | Clc/Ccs-O | Clc/Ccs-E | Clc/Ccs-O | 24O |
| n + 2 | Clc/Ccs-E | Clc/Ccs-O | Clc/Ccs-E | Clc/Ccs-O | |
|       | Clc/Ccs-O | Clc/Ccs-E | Clc/Ccs-O | Clc/Ccs-E | 24E |

Also, comparing Tables 3 and 6 with each other, it can be seen that each pair of sub-pixels adjacent to each other in the column direction (e.g., the lower sub-pixel of the pixel (n, m) and the upper sub-pixel of the pixel (n+1, m)) has the lower root-mean-square voltage "E" in Table 6. Thus, the distribution of the root-mean-square voltages shown in Table 6 has a lower spatial frequency than the distribution shown in Table 3.

The liquid crystal display device of preferred embodiments of the present invention may be driven not only by the dot inversion drive method described above but also by a combination of line inversion drive and frame inversion drive.

Figure 4:
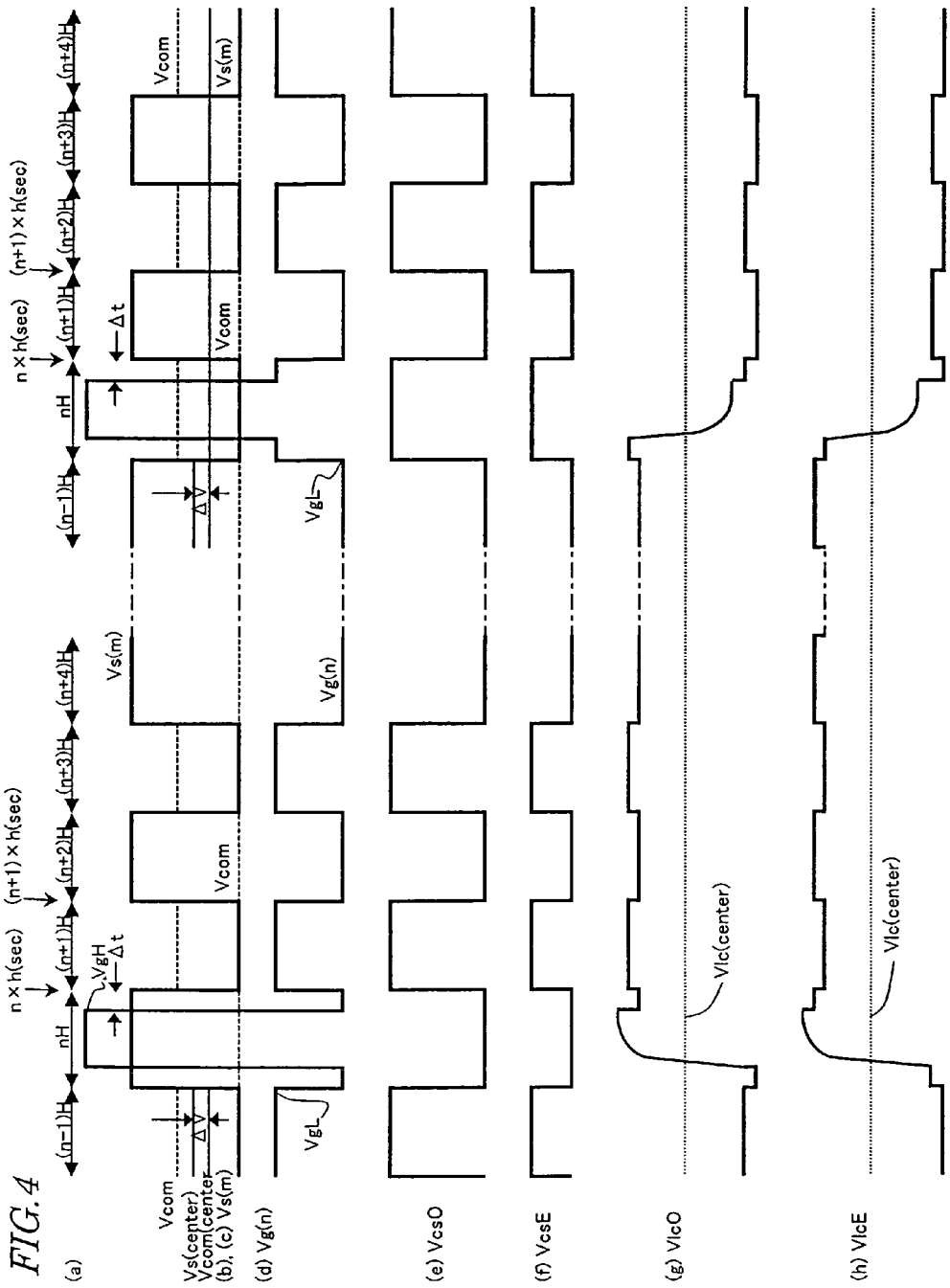
FIG. 4 shows the waveforms of still another set of voltages to be applied to drive the liquid crystal panel shown in FIG. 1.

FIG. 4 shows the waveforms of respective voltages to be applied in a line inversion drive method. In FIG. 4, the waveform of Vs (m±1) is not shown as the portion (b) because Vs (m±1) and Vs (m) have the same polarity. To broaden the OFF-state margin of the TFTs 16a and 16b and reduce the amount of current to be consumed by coupling, the gate signal voltage Vg has its low level VgL inverted at an interval of 1H. The counter electrode voltage Vcom and the storage capacitor counter voltages VcsO and VcsE are synchronized with each other and have their polarities inverted at an interval of 1H. In the example shown in FIG. 4, signals with mutually different amplitudes are used as the storage capacitor counter voltages VcsO and VcsE, thereby applying different root-mean-square voltages to respective sub-pixels.

When the drive method shown in FIG. 4 is adopted, the voltages being applied to the pixels have their polarities inverted row by row as shown in the following Table 7:

TABLE 7

|       | m − 1 | m | m + 1 | m + 2 |
|---|---|---|---|---|
| n − 1 | − | − | − | − |
| n     | + | + | + | + |
| n + 1 | − | − | − | − |
| n + 2 | + | + | + | + |

Also, by selecting the storage capacitor lines 24O and 24E, which are combined with the sub-pixel electrodes 18a and 18b and to which the storage capacitor counter electrodes are connected, as shown in the following Table 8, the voltage distribution shown in the following Table 9 is formed.

TABLE 8

|       | m − 1 | m | m + 1 | m + 2 |
|---|---|---|---|---|
| n − 1 | 24O | 24O | 24O | 24O |
|       | 24E | 24E | 24E | 24E |
| n     | 24O | 24O | 24O | 24O |
|       | 24E | 24E | 24E | 24E |
| n + 1 | 24O | 24O | 24O | 24O |
|       | 24E | 24E | 24E | 24E |
| n + 2 | 24O | 24O | 24O | 24O |
|       | 24E | 24E | 24E | 24E |

TABLE 9

|       | m − 1 | m | m + 1 | m + 2 | |
|---|---|---|---|---|---|
| n − 1 | Clc/Ccs-E | Clc/Ccs-E | Clc/Ccs-E | Clc/Ccs-E | |
|       | Clc/Ccs-O | Clc/Ccs-O | Clc/Ccs-O | Clc/Ccs-O | 24O |
| n     | Clc/Ccs-O | Clc/Ccs-O | Clc/Ccs-O | Clc/Ccs-O | |
|       | Clc/Ccs-E | Clc/Ccs-E | Clc/Ccs-E | Clc/Ccs-E | 24E |
| n + 1 | Clc/Ccs-E | Clc/Ccs-E | Clc/Ccs-E | Clc/Ccs-E | |
|       | Clc/Ccs-O | Clc/Ccs-O | Clc/Ccs-O | Clc/Ccs-O | 24O |
| n + 2 | Clc/Ccs-O | Clc/Ccs-O | Clc/Ccs-O | Clc/Ccs-O | |
|       | Clc/Ccs-E | Clc/Ccs-E | Clc/Ccs-E | Clc/Ccs-E | 24E |

In Table 6, the root-mean-square voltages being applied to sub-pixels that are adjacent to each other in the row direction alternate their levels. On the other hand, in Table 9, the sub-pixels that are adjacent to each other in the row direction all have either the relatively high root-mean-square voltage "O" or the relatively low root-mean-square voltage "E". In the column direction, the distribution of root-mean-square voltages in Table 9 is the same as that of root-mean-square voltages shown in Table 6. In terms of resultant display quality, the line inversion drive is inferior to the dot inversion drive. However, depending on the specific application of the liquid crystal display device, the line inversion drive technique is sometimes adopted to reduce the power dissipation, for example.

According to the preferred embodiments of the present invention described above, by controlling the voltages to be applied to the storage capacitor counter electrodes of the storage capacitors that are connected to respective sub-pixels, mutually different voltages VlcO and VlcE can be applied to the liquid crystal capacitors ClcO and ClcE of the respective sub-pixels.

Figure 5:
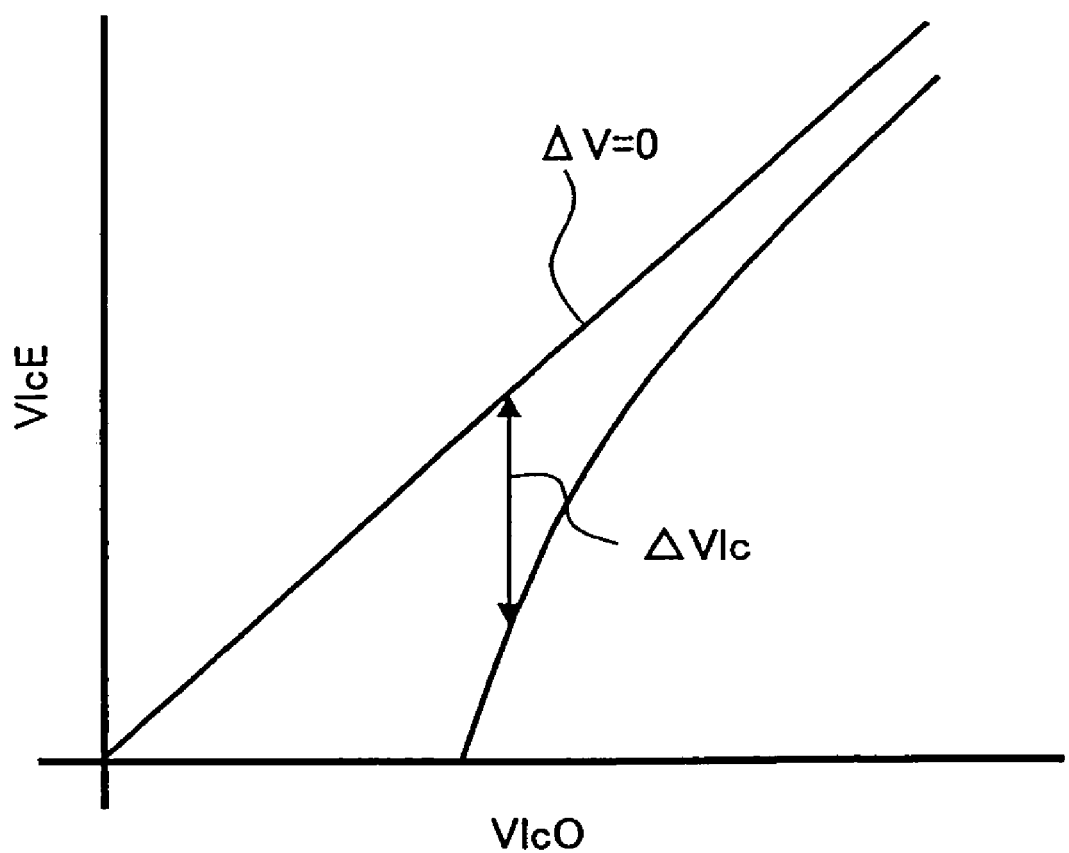
FIG. 5 is a graph showing the applied voltage dependence of a difference ΔVlc between root-mean-square voltages to be applied to sub-pixels in a liquid crystal display device according to a preferred embodiment of the present invention.

As shown in FIG. 5, the higher the (grayscale) voltage applied, the smaller the difference ΔVlc between the root-mean-square values of VlcO and VlcE. That is to say, supposing the grayscale satisfies $0 \leq gk \leq n$, the difference ΔVlc (gk) >0 volts and ΔVlc (gk)≧ΔVlc (gk+1) are satisfied in the entire grayscale range (i.e., $0 \leq gk \leq n$).

The applied voltage dependence of the difference between the root-mean-square voltages of the sub-pixels is opposite to the applied voltage dependence in the capacitance coupling method disclosed in Japanese Laid-Open Publication No. 6-332009 mentioned above. Also, in the arrangement of preferred embodiments of the present invention, there is no need to adjust the thickness of the insulating film to change the capacitance values of the storage capacitors and thereby control the difference in root-mean-square voltage between the sub-pixels. Thus, the gate insulating film may also be used as the insulating layer of the storage capacitors. It is because the capacitance values of the liquid crystal capacitors ClcO and ClcE depend on the voltage that the difference between the root-mean-square voltages of the sub-pixels has the applied voltage dependence as shown in FIG. 5.

Hereinafter, it will be described why the voltage dependence of ΔVlc shown in FIG. 5 is effective in improving the γ characteristic of a normally black mode liquid crystal display device.

First, the display characteristics of a typical MVA mode liquid crystal display device will be described with reference to FIGS. 6A, 6B, 6C and 6D. It should be noted that when the same voltage is applied to (the sub-pixel electrodes 18a and 18b of) the liquid crystal capacitors ClcO and ClcE of the sub-pixels, the liquid crystal display device 100 of this preferred embodiment exhibits almost the same display characteristic as the conventional liquid crystal display device.

Figure 6D:
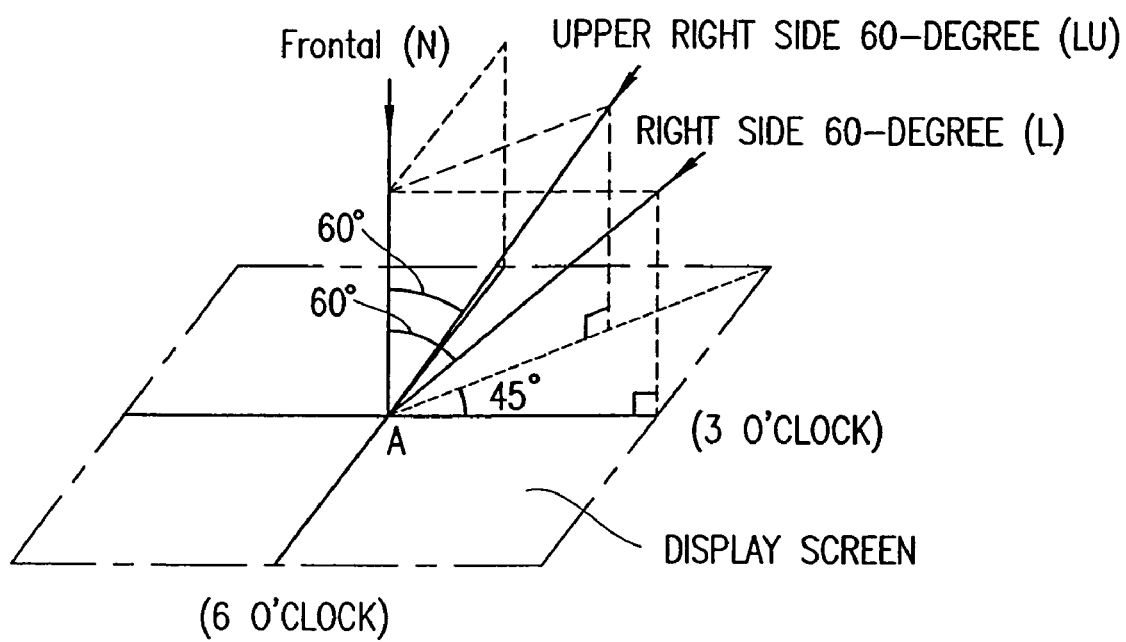
FIG. 6D shows the viewing angle directions N, L and LU for a liquid crystal display device.

FIG. 6A shows the applied voltage dependences N1, L1 and LU1 of transmittances as measured in a frontal viewing angle direction N, a right-side 60° viewing angle direction L and an upper-right-side 60° viewing angle direction LU, respectively. As shown in FIG. 6D, the frontal viewing angle direction N is defined by a normal (i.e., an angle that is perpendicular) to the display screen, the right-side 60° viewing angle direction L defines a viewing angle of about 60 degrees with the normal on the right-hand side and an azimuth angle of about 0 degrees with the three-o'clock direction on the display screen, and the upper-right-side 60° viewing angle direction LU defines a viewing angle of about 60 degrees with the normal on the right-hand side and an azimuth angle of about 45 degrees with the three o'clock direction on the display screen.

In FIG. 6B, the ordinates represent the transmittances that were measured in the directions N, L and LU and that were normalized with the transmittances resulting from the application of the white voltages (i.e., highest grayscale voltages) in the respective directions N, L and LU supposed to be 100%. Thus, FIG. 6B shows the applied voltage dependences N2, L2 and LU2 of the normalized transmittances that are associated with the curves N1, L1 and LU1, respectively.

As can be seen from FIG. 6B, the display characteristics N2, L2 and LU2 in the respective viewing angle directions N, L and LU are different from each other. This means that the γ characteristics are also different in the respective viewing directions N, L and LU.

FIG. 6C shows the difference in the γ characteristic even more clearly. In FIG. 6C, the abscissa represents (frontal viewing angle normalized transmittance÷100)^(1/2.2) while the ordinate represents the grayscale characteristics N3, L3 and LU3 that are obtained by (normalized transmittances in the respective directions N, L and LU÷100)^(1/2.2). In this case, "^" is the power, which represents the γ value. In a typical liquid crystal display device, the γ value of the frontal grayscale characteristic is preferably equal to about 2.2.

As shown in FIG. 6C, the frontal grayscale characteristic N3 in the direction N is a linear function because the ordinate is always equal to the abscissa. On the other hand, the grayscale characteristics L3 and LU3 in the viewing angle directions L and LU are represented by curves. The deviation of each of these curves L3 and LU3 from the line representing the frontal characteristic N3 shows the deviation of the γ characteristic at the viewing angle quantitatively, i.e., the difference in grayscales displayed between the frontal viewing angle direction N and the viewing angle direction L or Lu.

As described above, in a preferred embodiment of the present invention, each pixel includes first and second sub-pixels and mutually different root-mean-square voltages VlcO and VlcE are applied to the liquid crystal layer of the respective sub-pixels, thereby reducing the deviation of the γ characteristic. The reason will be described with reference to FIG. 6B. In the following description, the first and second sub-pixels are assumed to have the same area.

In the conventional liquid crystal display device, when the frontal transmittance thereof is represented by the point NA shown in FIG. 6B, the transmittance in the viewing angle direction L is represented by the point LA, which is associated with the same applied voltage as the point NA. In contrast, in a preferred embodiment of the present invention, the frontal transmittance represented by the point NA may be obtained by a combination of frontal transmittances of the first and second sub-pixels as represented by the points NB1 and NB2. In this case, the frontal transmittance at the point NB2 is substantially zero, and the transmittance at the point NB1 is approximately twice as high as the transmittance at the point NA because the first and second sub-pixels have the same area. Also, the difference in root-mean-square voltage between the points NB1 and NB2 is ΔVlc. Furthermore, in a preferred embodiment of the present invention, the transmittance in the viewing angle direction L is represented by the point P, which shows the average of the transmittances at the points LB1 and LB2 that are associated with the same voltages as the points NB1 and NB2, respectively.

As can be seen from FIG. 6B, the point P, representing the transmittance in the viewing angle direction L in the liquid crystal display device of preferred embodiments of the present invention, is closer to the point NA, representing the frontal transmittance, than the point LA, representing the transmittance in the same viewing angle direction L in the conventional liquid crystal display device, is. Thus, the deviation of the γ characteristic can be reduced in the preferred embodiments of the present invention.

Also, as can be seen from the foregoing description, the effects of various preferred embodiments of the present invention are increased by setting the transmittance of the second sub-pixel in the viewing angle direction L (as indicated by the point LB2) substantially equal to zero. In other words, to increase the effects of the preferred embodiments of present invention, the transmittance should not increase when the image is viewed obliquely in the black display state. In view of this consideration, phase difference compensators are preferably provided on both sides of the liquid crystal layer and have their retardations determined appropriately such that the transmittance does not increase when the image is observed obliquely in the black display state.

To improve the display quality of a liquid crystal display device having such γ characteristics, it is effective to improve the γ characteristics at relatively dark (or low) grayscales. That is to say, in a normally black mode display device, the difference ΔVlc in root-mean-square voltage between sub-pixels is preferably increased at lower grayscale voltages.

Figure 7A:
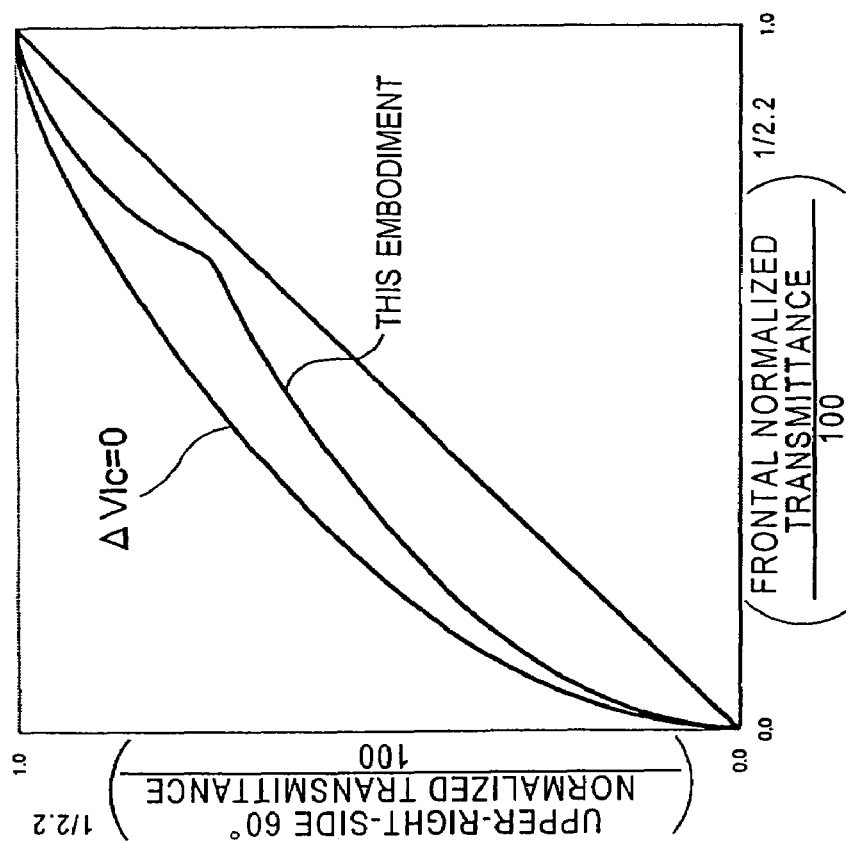
FIGS. 7A and 7B are graphs showing the γ characteristics in viewing angle directions L and LU of a liquid crystal display device according to a preferred embodiment of the present invention.
Figure 7B:
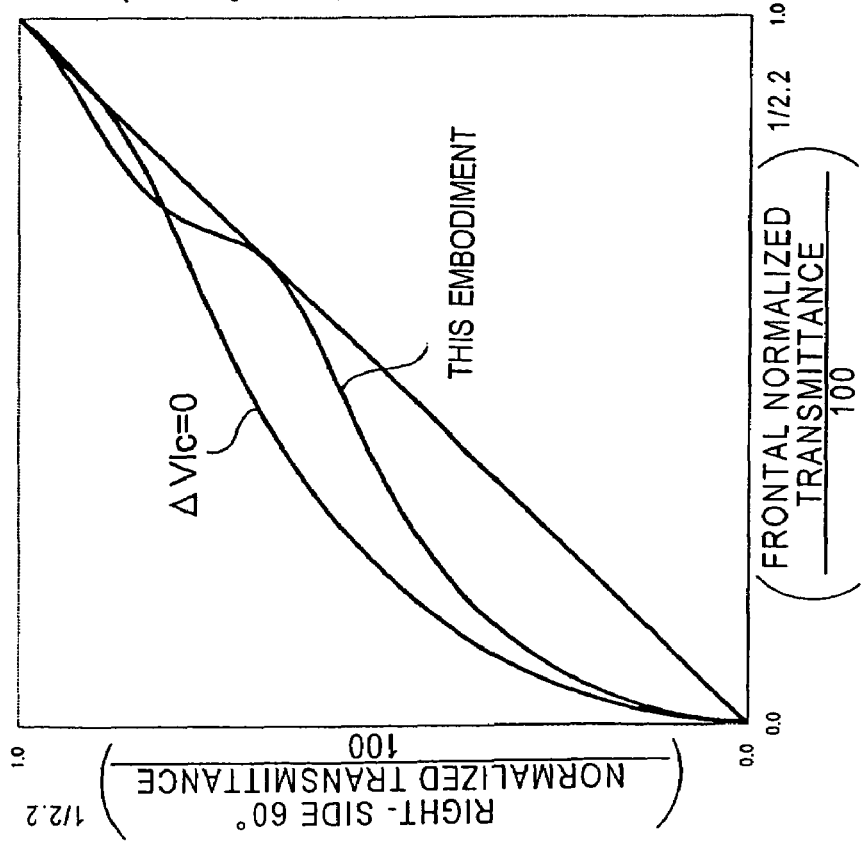

FIGS. 7A and 7B schematically show the γ characteristics of a liquid crystal display device 100 according to a preferred embodiment of the present invention to be described later with reference to FIGS. 8 and 9, for example. In FIGS. 7A and 7B, the γ characteristics to be obtained by applying the same voltage to the two sub-pixels (i.e., ΔVlc=0) are also shown for the purpose of comparison. As can be seen from the results shown in FIGS. 7A and 7B, the γ characteristics are improved in the preferred embodiment of the present invention no matter whether the image is observed in the viewing angle direction L or LU. In the liquid crystal display device of this preferred embodiment, the difference ΔVlc (0) between the root-mean-square voltages in the black display state is preferably about 1.5 volts and the difference ΔVlc (n) between the root-mean-square voltages in the white display state is preferably about 0 volts. Naturally, each of these differences may have any other value. However, if ΔVlc (gk) is greater than the threshold voltage Vth shown in FIG. 6B that the applied voltage dependence of the transmittance of the liquid crystal display device has, then the brightness (or transmittance) in the black display state will increase excessively to decrease the contrast ratio unintentionally. Thus, ΔVlc (0)≦Vth is preferably satisfied. To increase the brightness in the white display state, ΔVlc (n) is preferably approximately equal to zero.

Hereinafter, specific pixel structures will be described with reference to FIGS. 8, 9A, 9B and 10.

Figure 8:
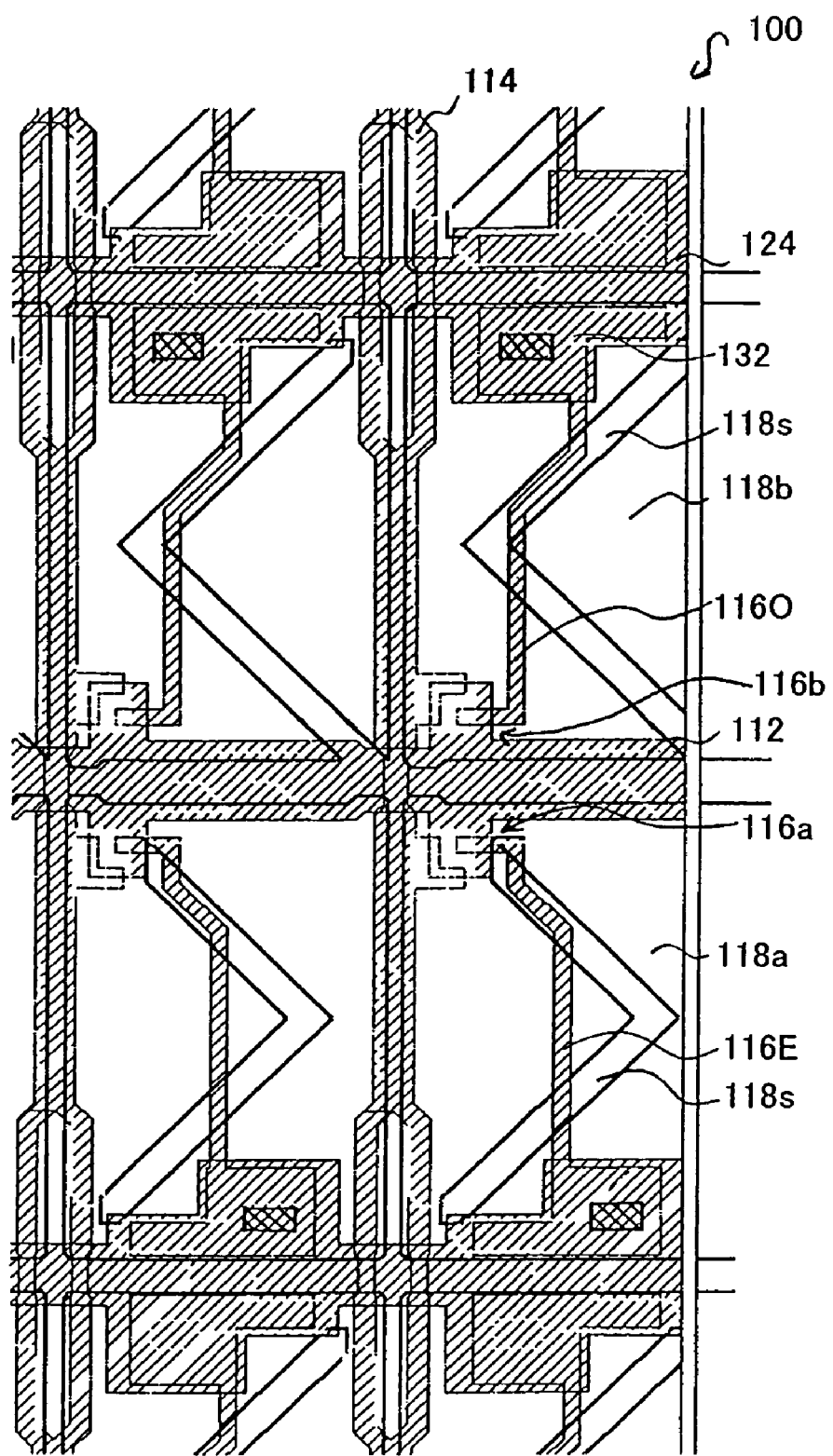
FIG. 8 is a plan view schematically illustrating the layout of an MVA mode liquid crystal display device 100 according to a preferred embodiment of the present invention.
Figure 9A:
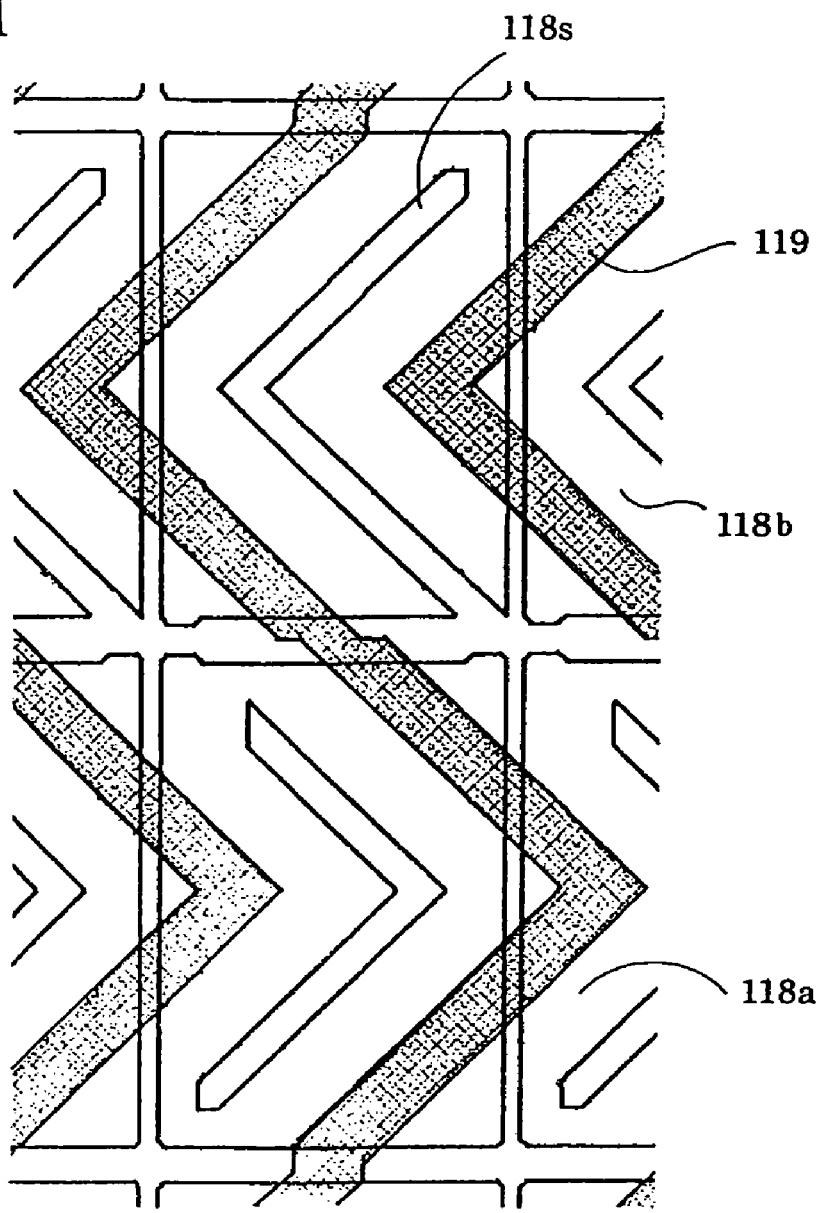
FIG. 9A is a plan view schematically showing the arrangement of ribs on the counter substrate of the liquid crystal display device 100.
Figure 9B:
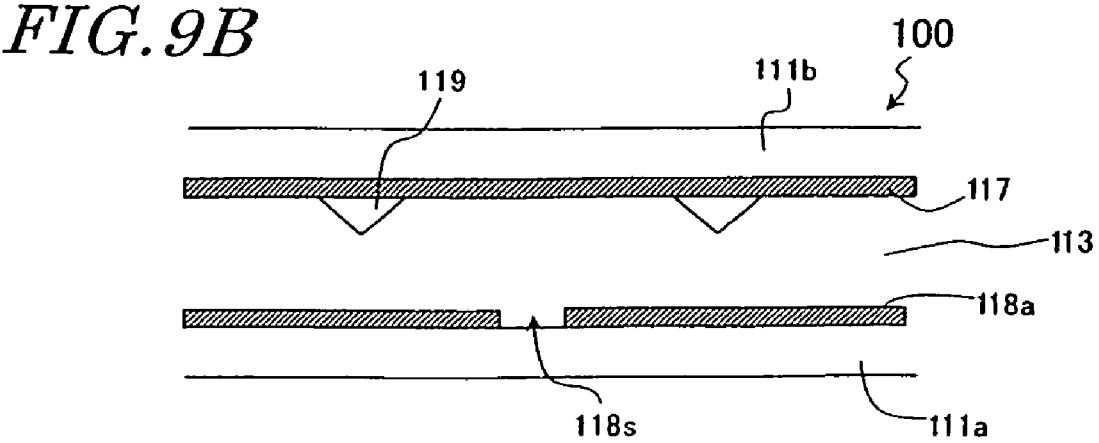
FIG. 9B is a schematic cross-sectional view of the liquid crystal display device 100.

FIGS. 8, 9A and 9B schematically illustrate the pixel structure of an MVA mode liquid crystal display device 100 according to a preferred embodiment of the present invention. Specifically, FIG. 8 shows the structure of an active-matrix substrate, FIG. 9A schematically shows the arrangement of ribs on a counter substrate, and FIG. 9B schematically shows a cross section of the liquid crystal display device 100. Although not shown in any of these drawings, the liquid crystal display device 100 preferably further includes a pair of phase difference compensators (typically phase difference compensating plates) on both sides of the liquid crystal panel, a pair of polarizers that sandwiches the phase difference compensators, and a backlight. The polarizers are arranged as a pair of crossed Nicols such that their transmission axes (which will also be referred to herein as "polarization axes") cross each other at right angles. While no voltage is being applied to the liquid crystal layer 113 (i.e., in the vertically aligned state), the liquid crystal display device 100 displays color black. The phase difference compensators are provided to improve the viewing angle characteristics of the liquid crystal display device and may be designed optimally by the known techniques. More specifically, the phase difference compensators are optimized such that the difference in (black) brightness between the oblique and frontal viewing angle directions is minimized in every azimuth direction. Then, the effects of preferred embodiments of the present invention are further improved.

In the liquid crystal display device 100, each pixel preferably includes two sub-pixel electrodes 118a and 118b, each of which includes a slit (i.e., an opening formed by partially removing the electrode layer) 118s.

As schematically illustrated in FIG. 9B, each of the sub-pixel electrodes 118a and 118b on one glass substrate 111a preferably includes a slit 118s and creates an oblique electric field with a counter electrode 117, which is arranged so as to face the sub-pixel electrodes 118a and 118b with the liquid crystal layer 113 interposed between them. Also, on the surface of the other glass substrate 111b on which the counter electrode 117 is provided, ribs 119 are arranged so as to protrude toward the liquid crystal layer 113. The liquid crystal layer 113 is preferably made of a nematic liquid crystal material having negative dielectric anisotropy. A pair of vertical alignment films (not shown) is arranged so as to cover the counter electrode 117 and the sub-pixel electrodes 118a and 118b and to create a vertically aligned state while no voltage is being applied to the liquid crystal layer 113. The sloped surfaces of the ribs 119 and the oblique electric field can make the vertically aligned liquid crystal molecules face the predetermined direction constantly.

As shown in FIG. 9B, the ribs 119 preferably have a substantially triangular cross section with the apex defined by two sloped surfaces thereof. The liquid crystal molecules are preferably aligned substantially perpendicularly to those sloped surfaces. Thus, the distribution of tilt angles of the liquid crystal molecules is defined by the ribs 119. As used herein, the "tilt angle" of the liquid crystal molecules is an angle that is defined by the major axis of the liquid crystal molecules with respect to the principal surface of the substrate. Meanwhile, the slits 118s regularly change the direction of the electric field to be applied to the liquid crystal layer 113. Thus, due to the actions of these ribs 119 and slits 118s, while the electric field is being applied to the liquid crystal layer, the liquid crystal molecules are aligned in the arrowed directions, i.e., upper-rightward, upper-leftward, lower-leftward and lower-rightward. As a result, good viewing angle characteristics, which are uniform both vertically and horizontally, are achievable. The rectangular display screen of the liquid crystal display device 100 is typically arranged such that the longer sides thereof extend horizontally. The polarizers (not shown), which are preferably arranged as a pair of crossed Nicols on the substrates 111a and 111b, are preferably disposed such that the transmission axes thereof are parallel to the longer sides of the display screen. On the other hand, the pixels are preferably arranged such that the longer sides of the pixels cross the longer sides of the display screen at right angles as shown in FIG. 8.

The pixel structure of the liquid crystal display device 100 will be described in further detail with reference to FIG. 8.

The sub-pixel electrodes 118a and 118b are preferably supplied with a source signal voltage from the common source line 114 by way of their associated TFTs 116a and 116b, respectively. The gate electrodes of the TFTs 116a and 116b are preferably combined with their common gate line 112 and are preferably provided between the sub-pixel electrodes 118a and 118b. The sub-pixel electrodes 118a and 118b are preferably arranged symmetrically with respect to the gate line 112. In this example, the sub-pixel electrodes 118a and 118b preferably have the same area.

The TFTs 116a and 116b preferably have extended drain electrodes 116E and 116O. A portion 132 of the extended drain electrode 116E or 116O, which faces a storage capacitor line 124 with an insulating layer (not shown) interposed between them, preferably functions as a storage capacitor electrode. The storage capacitor line 124 extends substantially parallel to the gate line 112. The insulating layer that forms the storage capacitor may be the gate insulating film of the TFTs 116a and 116b. The storage capacitor counter electrodes are preferably combined with the storage capacitor line 124. The storage capacitor line 124 is preferably shared by two pixels that are adjacent to each other in the row direction.

In the liquid crystal display device 100 having such a configuration, the storage capacitor counter voltages are supplied to the storage capacitor line 124, the viewing angle dependence of the γ characteristic is improved and an image of quality can be displayed.

Figure 10:
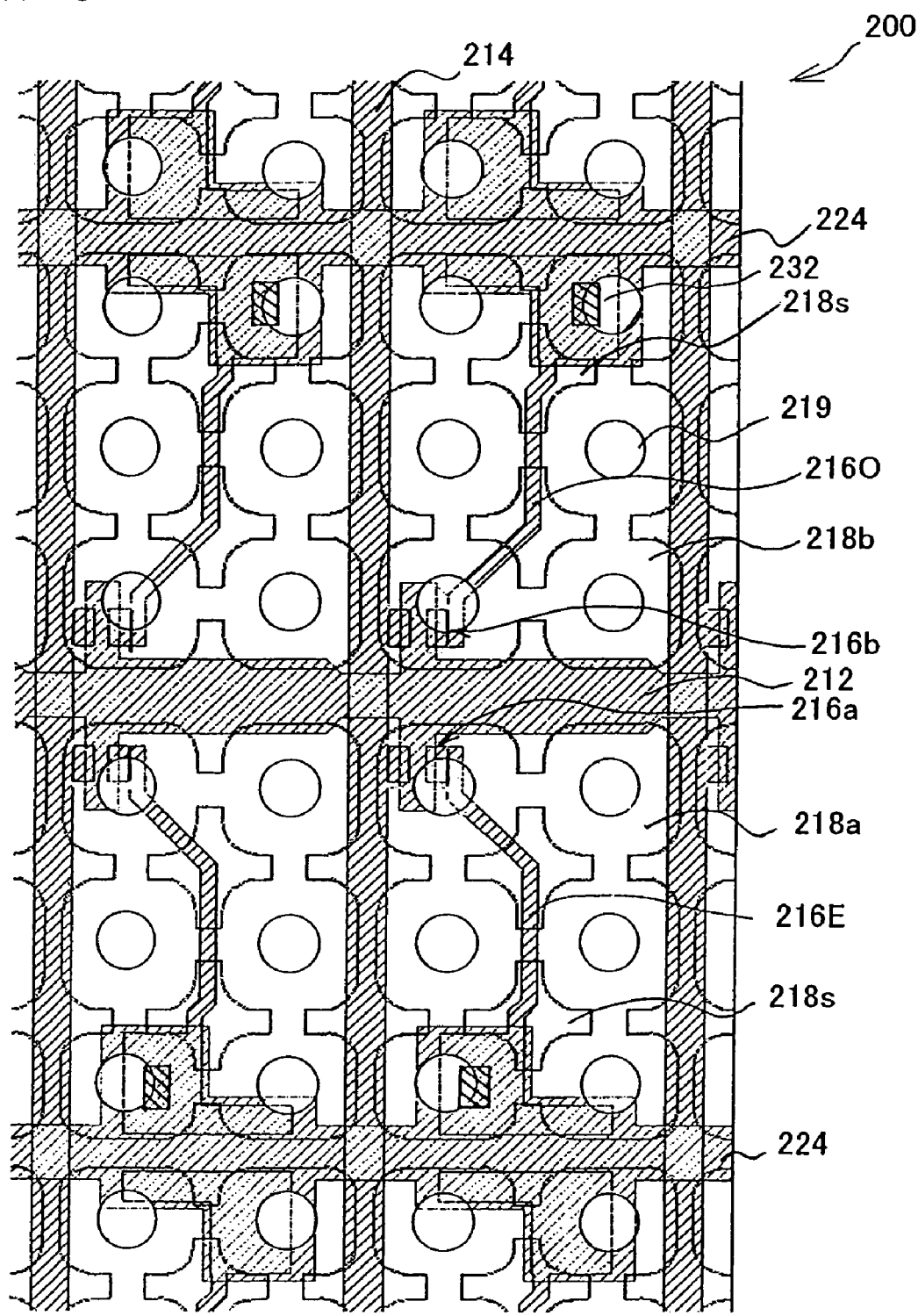
FIG. 10 is a plan view schematically illustrating the layout of an ASM mode liquid crystal display device 200 according to another preferred embodiment of the present invention.

FIG. 10 schematically illustrates the structure of a liquid crystal display device 200 according to another preferred embodiment of the present invention.

The liquid crystal display device 200 is preferably an ASM mode liquid crystal display device. As shown in FIG. 10, each of the sub-pixel electrodes 218a and 218b preferably includes substantially cross-shaped openings 218s. In this liquid crystal display device 200, these openings 218s and convex portions 219, provided for the counter substrate, preferably align the liquid crystal molecules of the vertical aligned liquid crystal layer (with negative dielectric anisotropy) axisymmetrically, thereby realizing an axisymmetric alignment while a voltage is being applied to the liquid crystal layer.

The liquid crystal display device 200 is preferably substantially the same as the liquid crystal display device 100 described above except that the sub-pixel electrodes 218a and 218b and the convex portions 219 (corresponding to the ribs 119 of the liquid crystal display device 100) of the liquid crystal display device 200 have different shapes from the counterparts of the liquid crystal display device 100.

In this liquid crystal display device 200, the sub-pixel electrodes 218a and 218b are preferably connected to the drains of TFTs 216a and 216b by way of extended drain electrodes 216E and 216O thereof. A portion 232 of the extended drain electrode 216E or 216O, which faces a storage capacitor line 224 with an insulating layer (or gate electrodes) interposed between them, preferably functions as a storage capacitor electrode. That is to say, the storage capacitor electrode 232, the insulating layer, and a storage capacitor counter electrode (i.e., a portion of the storage capacitor line 224) preferably define a storage capacitor. A gate line 212 and the storage capacitor line 224 extend substantially parallel to each other. The gate line 212 is preferably provided between the sub-pixel electrodes 218a and 218b. The storage capacitor line 224 is preferably shared by pixels that are adjacent to each other in the column direction.

The arrangements of the liquid crystal display devices 100 and 200 described above can be used effectively in the 2H dot inversion drive (see Tables 1 to 3) or the 1H dot inversion drive (see Tables 4 to 6). In performing a line inversion drive (see Tables 7 to 9), however, the gate line 112 or 212 does not have to be provided between the sub-pixel electrodes.

Figure 11A:
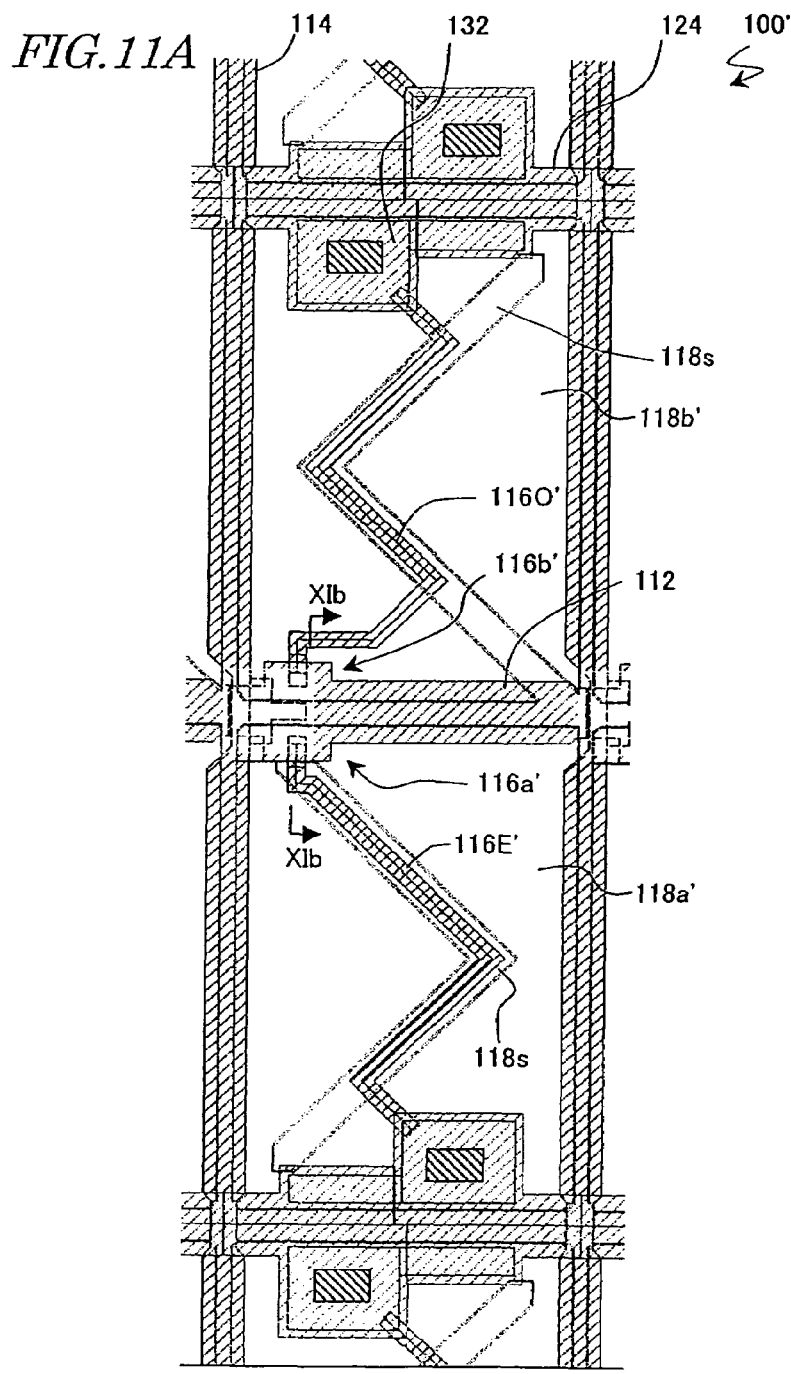
FIG. 11A is a plan view schematically illustrating the layout of a liquid crystal display device 100' according to still another preferred embodiment of the present invention.
Figure 11B:
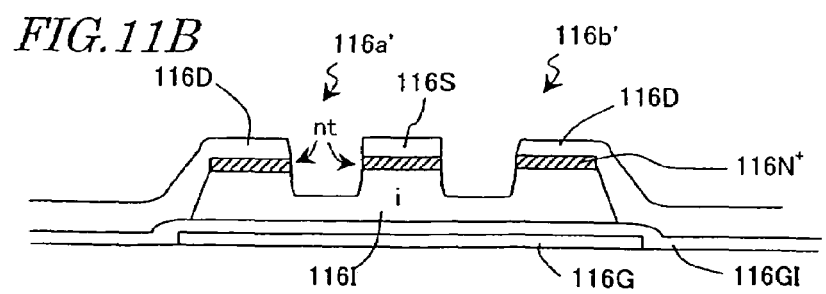
FIG. 11B is a cross-sectional view thereof as viewed on the plane XIb-XIb shown in FIG. 11A.

FIGS. 11A and 11B schematically illustrate the configuration of a liquid crystal display device 100' according to still another preferred embodiment of the present invention. Specifically, FIG. 11A is a plan view of the liquid crystal display device 100' and FIG. 11B is a cross-sectional view thereof as viewed on the plane XIb-XIb shown in FIG. 11A. Just like the liquid crystal display device 100 shown in FIG. 8, this liquid crystal display device 100' preferably is also an MVA mode liquid crystal display device. Thus, each member shared by these two liquid crystal display devices 100 and 100' is identified by the same reference numeral and the description thereof will be omitted herein.

The liquid crystal display device 100' shown in FIGS. 11A and 11B has a greater aperture ratio than the liquid crystal display device 100 shown in FIG. 8.

As shown in FIG. 11A, the extended drain electrodes 116E' and 116O' are preferably arranged so as to mostly overlap with the slits 118s of their associated sub-pixel electrodes 118a' and 118b', respectively. The portions of the liquid crystal layer, which are associated with the slits 118s, are not used for display purposes. Thus, by locating the majority of the extended drain electrodes 116E' and 116O' in those regions, the decrease in aperture ratio can be minimized.

Furthermore, the TFTs 116a' and 116b' have a so-called "TFT on-gate structure". Accordingly, the areas to be allocated for the TFTs 116a' and 116' can also be decreased and therefore an increased aperture ratio is achieved.

Next, the cross-sectional structure of the TFTs 116a' and 116b' will be described with reference to FIG. 11B.

As shown in FIG. 11B, a gate electrode 116G is preferably provided as a portion of the gate line 112 on a substrate (e.g., a glass substrate). A gate insulating film 116GI is preferably provided over almost the entire surface of the substrate as well as over the gate electrode 116G. A semiconductor layer such as an a-Si layer is preferably arranged so as to face the gate electrode 116G with the gate insulating film 116GI interposed between them. This semiconductor layer preferably includes an intrinsic semiconductor layer 116I and an $n^+$-type semiconductor layer 116N$^+$. The $n^+$-type semiconductor layer 116N$^+$ is preferably divided into three portions including a source region shared by these two TFTs 116a' and 116b' and two drain regions for the two TFTs 116a' and 116b'. A source electrode 116S is preferably further provided on the source region, and drain electrodes 116D for the two TFTs 116a' and 116b' are preferably further provided on the two drain regions.

The gate electrode 116G, which is a portion of the gate line 112, preferably functions as a common gate electrode for the two TFTs 116a' and 116b', and the source electrode 116S preferably functions as a common source electrode for the two TFTs 116a' and 116b'. And portions of the intrinsic semiconductor layer 116I, which are located between the source electrode 116S and the two drain electrodes 116D, preferably functions as a channel region.

By adopting such a TFT on-gate structure, the areas to be allocated for the TFTs can be reduced significantly as compared with the arrangement shown in FIG. 8 in which the TFTs 116a and 116b have gate electrodes as respective branches of the gate line 112.

Figure 12:
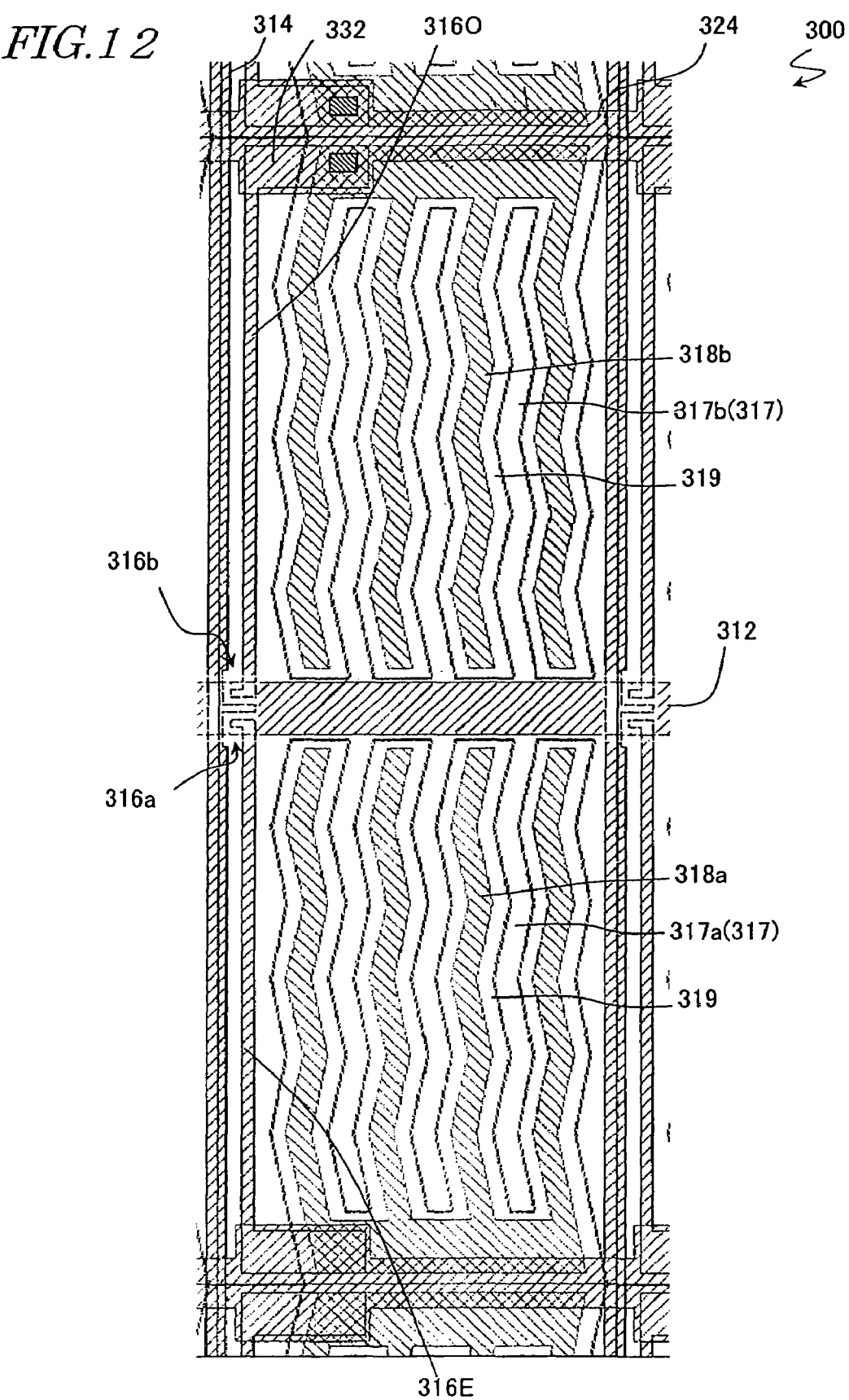
FIG. 12 is a plan view schematically illustrating the layout of a liquid crystal display device 300 according to yet another preferred embodiment of the present invention.

FIG. 12 schematically illustrates an arrangement for a liquid crystal display device 300 according to yet another preferred embodiment of the present invention.

The liquid crystal display devices 100, 100' and 200 of the preferred embodiments described above are normally black mode liquid crystal display devices, each including a vertical aligned liquid crystal layer that is made of a nematic liquid crystal material with negative dielectric anisotropy. On the other hand, the liquid crystal display device 300 of this preferred embodiment is a normally black mode liquid crystal display device including a parallel aligned liquid crystal layer that is made of a nematic liquid crystal material with positive dielectric anisotropy.

The liquid crystal display device 300 of this preferred embodiment is a so-called "IPS mode" liquid crystal display device in which a lateral electric field is generated substantially parallel to the surface of the liquid crystal layer in portions of the liquid crystal layer that are located in the gaps 319 between sub-pixel electrodes 318a and 318b and counter electrodes 317a and 317b. The counter electrodes 317a and 317b of the two sub-pixels are actually combined together into a single electrode.

The sub-pixel electrodes 318a and 318b are preferably connected to the drain electrodes of two TFTs 316a and 316b to be controlled in response to a gate signal that is supplied through a gate line 312. The TFTs 316a and 316b preferably have the TFT on-gate structure and preferably share a source electrode combined with a source line 314. A portion 332 of the extended drain electrode 316E or 316O of the TFT 316a or 316b, which faces a storage capacitor line 324 with an insulating layer (or gate electrodes) interposed between them, preferably functions as a storage capacitor electrode. That is to say, the storage capacitor electrode 332, the insulating layer, and a storage capacitor counter electrode (i.e., a portion of the storage capacitor line 324) preferably define a storage capacitor.

This IPS mode liquid crystal display device 300 is also represented by the equivalent circuit diagram shown in FIG. 1 and can also improve the viewing angle dependence of the γ characteristic. According to preferred embodiments of the present invention, the viewing angle dependence of the γ characteristic is improved particularly noticeably in the normally black mode liquid crystal display devices 100, 100' and 200, each including the vertical aligned liquid crystal layer. However, the present invention is in no way limited to these specific preferred embodiments. Thus, as long as the present invention is implemented as a normally black mode liquid crystal display device, the viewing angle dependence is also improvable in any other display mode such as a TN mode, for example.

Next, exemplary TFT on-gate structures for use in liquid crystal display devices according to preferred embodiments of the present invention will be described with reference to FIGS. 13A, 13B and 13C.

Figure 13A:
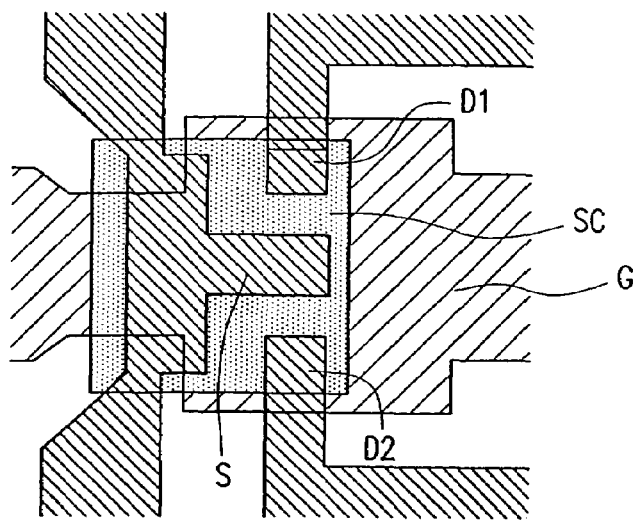
FIGS. 13A, 13B and 13C are plan views schematically illustrating exemplary TFT on-gate structures for use in liquid crystal display devices according to preferred embodiments of the present invention.

The structure shown in FIG. 13A is the same as that of the TFTs 116a' and 116b' of the liquid crystal display device 100' shown in FIG. 11B. Specifically, a gate electrode G is preferably provided as a portion of a gate line and is preferably covered with a gate insulating film (not shown). A semiconductor layer SC is preferably provided on the gate insulating film. A source electrode S and two drain electrodes D1 and D2 are preferably provided on the semiconductor layer SC. To define a channel region in portions of the semiconductor layer SC between the source electrode S and the drain electrodes D1 and D2, the gate electrode G is located under these source and drain electrodes S, D1 and D2.

To reduce the amount of leakage current that might flow between the source electrode S and the gate electrode G, the semiconductor layer SC is preferably present in the entire overlap area between the source electrode S and the gate electrode G. Also, to decrease the capacitance to be created between the source electrode S and the gate electrode G, the overlap area between the source electrode S and the gate electrode G preferably has a narrowed width.

Figure 13B:
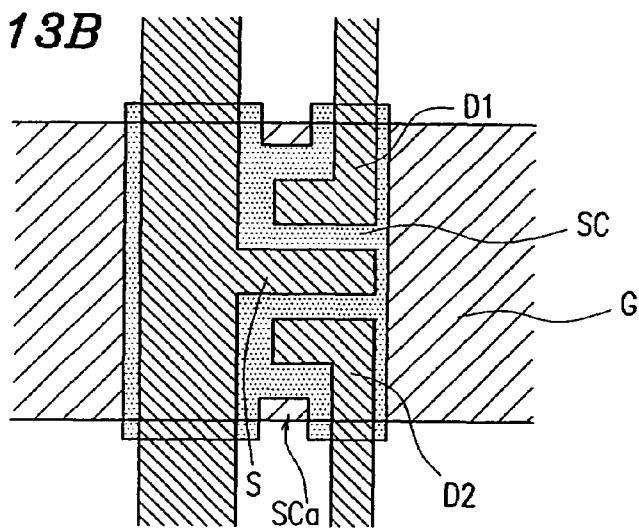

The structure shown in FIG. 13B is the same as that of the TFTs 316a and 316b of the liquid crystal display device 300 shown in FIG. 12. When the arrangement shown in FIG. 13B is adopted, substantially L-shaped channel regions are formed between the source electrode S and the drain electrodes D1 and D2. Thus, the channel regions can have an increased width (i.e., length as measured along the letter L) and the TFTs can have an increased amount of ON-state current.

In the arrangement shown in FIG. 13B, portions of the semiconductor layer SC between the source electrode S and the drain electrodes D1 and D2 preferably have notches SCa. Without these notches SCa, some portions of the semiconductor layer SC will be located between the source electrode S and the drain electrodes D and will not be underlain by the gate electrode G. In that case, the electric field generated from the gate electrode G will not reach those portions of the semiconductor layer SC to produce the leakage current unintentionally. In the example illustrated in FIG. 13B, the semiconductor layer SC is provided with the notches SCa. Alternatively, the portions of the semiconductor layer SC between the source electrode S and the drain electrodes D1 and D2 may be arranged so as not to exceed the width of the gate electrode G.

Figure 13C:
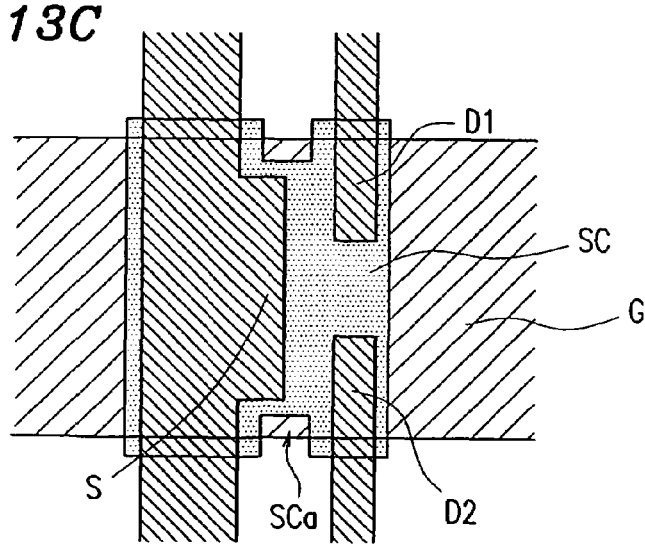

As another alternative, the simple arrangement shown in FIG. 13C may also be adopted. In the arrangements shown in FIGS. 13A and 13B, the drain electrodes D1 and D2 are preferably arranged so as to face each other with the source electrode S interposed between them. However, as in the arrangement shown in FIG. 13C, substantially parallel channels may also be defined by arranging the drain electrodes D1 and D2 on the same side with respect to the source electrode S. As in the arrangement shown in FIG. 13B, the semiconductor layer SC of the arrangement shown in FIG. 13C is also provided with notches SCa to reduce the amount of leakage current that might flow between the source electrode S and the drain electrodes D1 and D2.

According to preferred embodiments of the present invention, not only these TFT on-gate structures but also any of various other known ones may be adopted as well. In any case, as long as such a TFT on-gate structure is adopted, the pixel aperture ratio can be increased and the brightness of an image on the liquid crystal display device can be increased.

Various preferred embodiments of the present invention have been described as being applied to a liquid crystal display device preferably including TFTs as its switching elements. Alternatively, the present invention may also be applied to a liquid crystal display device including any other type of switching elements such as MIMs.

Various preferred embodiments of the present invention described above provide an arrangement that can apply mutually different voltages to respective sub-pixels in a pixel-divided liquid crystal display device with good controllability.

Also, according to preferred embodiments of the present invention, the viewing angle dependence of the γ characteristic can be improved in a normally black mode liquid crystal display device.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A liquid crystal display device comprising:
 a plurality of pixels which are arranged in columns and rows and each of which includes a portion of a liquid crystal layer, each of said plurality of pixels including a first sub-pixel and a second sub-pixel, in which mutually different voltages are applicable to portions of the liquid crystal layer associated with the first sub-pixel and the second sub-pixel;

gate lines, which extend along the rows of pixels;

source lines, which extend along the columns of pixels; and switching elements, at least one of the switching elements being provided for each of the first and second sub-pixels of an associated one of the plurality of pixels and being connected to one of the gate lines and one of the source lines; wherein each of the first and second sub-pixels including:

a liquid crystal capacitor, which is defined by a counter electrode and a sub-pixel electrode that faces the counter electrode by way of the liquid crystal layer; and a storage capacitor, which is defined by a storage capacitor electrode, an insulating layer, and a storage capacitor counter electrode, the storage capacitor electrode being electrically connected to the sub-pixel electrode, the storage capacitor counter electrode facing the storage capacitor electrode by way of the insulating layer;

wherein ON/OFF state of the at least one of the switching elements is controlled by a gate signal voltage to be supplied through the associated gate line;

wherein when the at least one of the switching elements is ON, a source signal voltage is supplied through the associated source line to the sub-pixel electrode and the storage capacitor electrode of an associated one of the first and second sub-pixels;

wherein after the at least one of switching elements has been turned OFF, voltages applied to the storage capacitor counter electrode of the associated one of the first and second sub-pixels varies; and wherein at least one of the direction and magnitude of variation at the first sub-pixel is different from at least one of the direction and magnitude of variation at the second sub-pixel of the associated one of the plurality of pixels.

2. The liquid crystal display device of claim 1, wherein the direction of variation at the first sub-pixel is different from the direction of variation at the second sub-pixel.

3. The liquid crystal display device of claim 1, wherein voltages applied to the storage capacitor counter electrodes invert polarities thereof at regular intervals.

4. The liquid crystal display device of claim 3, wherein voltages applied to the storage capacitor counter electrodes of the first and second sub-pixels are out of phase with each other by 180 degrees.

5. The liquid crystal display device of claim 4, wherein voltages applied to the storage capacitor counter electrodes of the first and second sub-pixels have the same amplitude.

6. The liquid crystal display device of claim 1, wherein the source signal voltage to be supplied through each of said source lines inverts its polarity every time a predetermined number of gate lines have been selected.

7. The liquid crystal display device of claim 1, wherein the source signal voltages to be supplied through each pair of adjacent source lines have mutually opposite polarities.

8. The liquid crystal display device of claim 7, wherein the source signal voltage to be supplied through each of said source lines inverts its polarity every time gate lines for two rows of pixels have been selected, and wherein voltages applied to the storage capacitor counter electrodes and the source signal voltage invert their polarities at the same interval but are out of phase with each other by one half period.

9. The liquid crystal display device of claim 7, wherein the source signal voltage to be supplied through each of said source lines inverts its polarities every time gate lines for two rows of pixels have been selected; and wherein voltages applied to the storage capacitor counter electrodes invert their polarities at one half of the interval at which the source signal voltage inverts its polarities, but are in phase with the source signal voltage.

10. The liquid crystal display device of claim 7, wherein the source signal voltage to be supplied through each of said source lines inverts its polarities every time at least one gate line for one row of pixels is selected; and wherein voltages applied to the storage capacitor counter electrodes invert their polarities at the same interval as the source signal voltage and are in phase with the source signal voltage.

11. The liquid crystal display device of claim 1, wherein each of said gate lines is provided between the first and second sub-pixels of its associated pixels.

12. The liquid crystal display device of claim 1, further comprising storage capacitor lines, each of which is connected to the storage capacitor counter electrodes of the first and second sub-pixels of its associated pixels and is provided between its associated adjacent pixels substantially parallel to the gate lines.

13. The liquid crystal display device of claim 1, wherein when each of said plurality of pixels conducts a display operation at a grayscale gk falling within a range of $0 \leq gk \leq n$ (where gk and n are both integers and the greater the grayscale gk the higher the brightness of the grayscale), a difference $\Delta Vlc(gk)$ between root-mean-square voltages to be applied to the portions of the liquid crystal layer that are associated with the first and second sub-pixels is greater than 0 volts, $\Delta Vlc(gk) \geq \Delta Vlc(gk+1)$ is satisfied, and the display operation is conducted in a normally black mode.

14. The liquid crystal display device of claim 1, wherein the liquid crystal layer is a vertical aligned liquid crystal layer and includes a nematic liquid crystal material having negative dielectric anisotropy.

15. The liquid crystal display device of claim 14, wherein the portions of the liquid crystal layer that are associated with the first and second sub-pixels include four domains in which liquid crystal molecules are tilted in four different directions when a voltage is applied thereto, the four different directions being defined by four azimuth angles that are different from each other by 90 degrees.

16. The liquid crystal display device of claim 1, wherein the liquid crystal layer is a parallel aligned liquid crystal layer and includes a nematic liquid crystal material having positive dielectric anisotropy; and wherein the counter electrode and the sub-pixel electrodes generate an electric field substantially parallel to the surface of the liquid crystal layer.

17. The liquid crystal display device of claim 1, wherein the liquid crystal display device is one of an MVA mode liquid crystal display device, an ASM liquid crystal display device and an PS mode liquid crystal display device.

18. The liquid crystal display device of claim 1, wherein the liquid crystal display device is a dot inversion and frame inversion liquid crystal display device.

19. The liquid crystal display device of claim 1, further comprising a TFT on-gate structure.

20. The liquid crystal display device of claim 1, wherein the switching elements comprise one of TFTs and MIMs.

* * * * *

UNITED STATES PATENT AND TRADEMARK OFFICE
CERTIFICATE OF CORRECTION

| | |
|---|---|
| PATENT NO. | : 7,595,781 B2 |
| APPLICATION NO. | : 11/314127 |
| DATED | : September 29, 2009 |
| INVENTOR(S) | : Takeuchi et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 458 days.

Signed and Sealed this

Twenty-eighth Day of September, 2010

David J. Kappos
*Director of the United States Patent and Trademark Office*